(12) United States Patent
Hubble, III et al.

(10) Patent No.: US 6,633,382 B2
(45) Date of Patent: Oct. 14, 2003

(54) ANGULAR, AZIMUTHAL AND DISPLACEMENT INSENSITIVE SPECTROPHOTOMETER FOR COLOR PRINTER COLOR CONTROL SYSTEMS

(75) Inventors: Fred F. Hubble, III, Rochester, NY (US); Tonya L. Love, Rochester, NY (US); Daniel A. Robbins, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 72 days.

(21) Appl. No.: 09/862,945

(22) Filed: May 22, 2001

(65) Prior Publication Data

US 2002/0191188 A1 Dec. 19, 2002

(51) Int. Cl.⁷ ................................................. G01J 3/50
(52) U.S. Cl. ......................................... 356/402; 356/73
(58) Field of Search ................................. 356/405, 406, 356/419, 425, 402, 407, 73; 347/19; 250/226, 227.29

(56) References Cited

U.S. PATENT DOCUMENTS

| | | | |
|---|---|---|---|
| 3,910,701 A | 10/1975 | Henderson et al. | 356/39 |
| 4,553,033 A | 11/1985 | Hubble, III et al. | 250/353 |
| 4,989,985 A | 2/1991 | Hubble, III et al. | 356/445 |
| 5,078,497 A | 1/1992 | Borton et al. | 356/446 |
| 5,137,364 A | 8/1992 | McCarthy | 356/402 |
| 5,272,518 A | 12/1993 | Vincent | 356/405 |
| 5,377,000 A | * 12/1994 | Berends | 356/407 |
| 5,526,190 A | 6/1996 | Hubble, III et al. | 359/719 |
| 5,671,059 A | 9/1997 | Vincent | 356/402 |
| 5,748,221 A | 5/1998 | Castelli et al. | 347/232 |
| 5,838,451 A | 11/1998 | McCarthy | 356/406 |
| 5,844,680 A | 12/1998 | Sperling | 356/303 |
| 5,963,333 A | 10/1999 | Walowit et al. | 356/425 |
| 6,020,583 A | 2/2000 | Walowit et al. | 250/226 |
| 6,147,761 A | 11/2000 | Walowit et al. | 356/425 |
| 6,157,454 A | 12/2000 | Wagner et al. | 356/407 |

* cited by examiner

Primary Examiner—James Phan

(57) ABSTRACT

An improved and lower cost color spectrophotometer, especially suitable for an on-line color printer color control system, in which plural different spectra LEDs sequentially perpendicularly illuminate a common and substantially circularly illuminated color test area, which may be variably spaced and variably oriented relative to the spectrophotometer, through a common central lens system, and also the reflected illumination therefrom may be measured at 45 degrees thereto by averaging the outputs of photodetectors spaced around that circularly illuminated color test area, to provide reduced sensitivity to the variable angular or azimuthal orientation of the color test area relative to the spectrophotometer, and which photodetectors may be so illuminated by 1:1 optics for spatial insensitivity.

19 Claims, 11 Drawing Sheets

ANGULAR, AZIMUTHAL AND DISPLACEMENT INSENSITIVE SPECTROPHOTOMETER FOR COLOR PRINTER COLOR CONTROL SYSTEMS

Cross reference is made to a continuation-in-part of this application, filed Nov. 28, 2001 as U.S. Appln. No. 09/994,666.

Cross-reference and incorporation by reference is made to the following copending and commonly assigned U.S. patent applications: U.S. Appln. No. 09/448,987, filed Nov. 24, 1999, Attorney Docket No. D/99511Q, now U.S. Pat. No. 6,351,308, issued Feb. 26, 2002, and U.S. Appln. No. 09/449,263, filed Nov. 24, 1999, Attorney Docket No. D/99511Q1, both by Lingappa K. Mestha; Continuation-In-Part Appln. No. 09/535,007, filed Mar. 23, 2000, by the same Fred F. Hubble, III and Joel A. Kubby, Attorney Docket No. D/99511i, now U.S. Pat. No. 6,384,918 issued May 7, 2002, claiming priority from U.S. Appln. No. 09/448,774, filed Nov. 24, 1999, Attorney Docket No. D/99511 (abandoned); and Appln. No. 09/862,247, filed May 22, 2001: by Jagdish C. Tandon and Lingappa K. Mestha, Attorney Docket No. D/99660.

Disclosed in the embodiments herein is an improved, low cost, color spectrophotometer for color calibration or correction systems, highly suitable to be used for, or incorporated into, the color calibration or control of various color printing systems or other on-line color control or color processing systems.

In particular, the disclosed spectrophotometer provides improved accuracy for color test surfaces which may be tilted, curved, non-planer or otherwise varying in angular orientation relative to the spectrophotometer. That is particularly desirable for enhancement of the accuracy of a non-contact spectrophotometer which can measure the colors or color densities of test surfaces spaced from the spectrophotometer, especially moving surfaces, such as printed paper sheets in the output path of a color printer, or toner or liquid ink test patches on a moving photoreceptor or other surface, or other moving color objects, webs or materials, without requiring the test surface material to be constrained against a reference surface or against the spectrophotometer.

This freedom of movement of the test material, both transversely to, and variably spaced from, the spectrophotometer, can be quite desirable in various color measurement applications, such as allowing printed sheets to move freely between relatively widely spaced apart paper path baffles or guides. However, that freedom of movement can also allow the color test surface material or media to have variances in angular alignment relative to the spectrophotometer, which may be manifested by lead and trail edge curl or buckle induced by the media handling apparatus, or otherwise. The disclosed embodiments can desirably reduce measurement and output signal errors from such variances in angular alignment. There can also be azimuthal or media rotation measurement variances from differences in media reflectivity such as paper fiber orientation.

As will be further described, the improved angular and azimuthal insensitivity of the embodiment herein is fully compatible with, and is shown herein combinable with, various of the spectrophotometer features of the above-cross-referenced copending commonly owned U.S. Applications, especially the displacement insensitivity system of the above cross-referenced copending commonly owned U.S. application Ser. No. 09/535,007, filed Mar. 23, 2000, by the same Fred F. Hubble, III and Joel A. Kubby. Also it is optionally compatible with the multiple different photo-sites detectors of the above cross-referenced, commonly owned and contemporaneously filed Application by Jagdish C. Tandon and Lingappa K. Mestha, Attorney Docket No. D/99660 (also described herein, as an alternative embodiment).

In the specific exemplary spectrophotometer embodiment further described below, it may be seen that plural different color emission LEDs sequentially project their respective illuminations substantially in parallel, perpendicularly to the color test target surface, rather than at an angle thereto, so as to provide a substantially circular, rather than elliptical, commonly illuminated area of the test target. That is, with all the LEDs centrally located together, their illumination pattern on the test target may be formed from rays that hit the target at approximately 90 degrees, i.e., normal to the target. This will produce a circular or nearly circular irradiance pattern on a selected area of the target when the target surface is at 90 degrees thereto. One or more photo-sensors may be optically oriented at 45 degrees to the test target to receive the reflected light from the illuminated test target. As will be further explained herein, when the test target surface deviates from said 90 degrees, by factors such as paper lead or trail edge curl, paper buckle or corrugation, sensor mounting misalignment, or other effects, this circular LED irradiance pattern becomes only slightly elliptical, with little area change, and thus causes little variance in the target irradiance and, therefore, in the signals from the photo-sensors, hence providing improved spectrophotometer angular insensitivity.

An additional feature for improved spectrophotometer accuracy in the disclosed embodiment is to provide averaging of the outputs of plural photodetectors which are angularly viewing the target irradiance area from different positions around it, on opposing sides, so as to average any varying angular and/or azimuthal reflectivity of the target area, and thus further increase the insensitivity to changes in alignment with the target area.

Although not limited thereto, the exemplary spectrophotometer of the embodiments is shown and described herein as an integral part of an automatic on-line continuous color correction system of a color printer. That is because such a low cost spectrophotometer may be affordably provided and easily mounted in the output paths of color printers for automatic measurement of automatically printed color test sheets, without any manual effort or intervention being required, and without interfering with normal printing or the normal movement of printed sheets in the output path of the printer. Such color control systems are further described in the above and below cited co-pending applications and patents. For example, in Xerox Corp. U.S. Pat. No. 6,178,007 B1, issued Jan. 23, 2001, based on U.S. application Ser. No. 08/786,010, filed Jan. 21, 1997 by Steven J. Harrington, Attorney Docket No. D/96644, entitled "Method For Continuous Incremental Color Calibration For Color Document Output Terminals." The European patent application equivalent thereof was published by the European Patent Office on Jul. 22, 1998 as EPO publication No. 0 854 638 A2. Also, Xerox Corp. U.S. Pat. No. 6,222,648, issued Apr. 24, 2001, based on U.S. application Ser. No. 08/787,524, also filed Jan. 21, 1997, by Barry Wolf, et al, entitled "On Line Compensation for Slow Drift of Color Fidelity in Document Output Terminals (DOT)," Attorney Docket No. D/96459. Also noted are Xerox Corp. U.S. Pat. No. 6,157,469, issued Dec. 5, 2000 and filed May 22, 1998, by Lingappa K. Mestha; Apple Computer, Inc. U.S. Pat. No. 5,881,209, issued Mar. 9, 1999; U.S. Pat. No. 5,612,902, issued Mar. 18, 1997 to Michael Stokes, and other patents and applications further noted below.

A low cost, relatively simple, spectrophotometer, as disclosed herein, is thus particularly (but not exclusively) highly desirable for such a "colorimetry" function for such an on-line printer color correction system. Where at least one dedicated spectrophotometer is being provided in each printer, its cost and other factors becomes much more significant, as compared to the high cost (and other unsuitability's for on-line use) of typical laboratory spectrophotometers.

An early patent of interest as to suggesting colorimetry in the printed sheets output of a color printer is Xerox Corp. U.S. Pat. No. 5,748,221, issued May 5, 1998 to Vittorio Castelli, et al, filed Nov. 1, 1995 (D/95398). This patent is also of particular interest here for its Col. 6, lines 18 to 28 description of measuring color:

" . . . by imaging a part of an illuminated color patch on three amorphous silicon detector elements after filtering with red, green and blue materials. The technology is akin to that of color input scanners. The detector outputs can be used as densitometric values to assure color consistency. Calibration of the resulting instrument outputs against measurement by laboratory colorimeters taken over a large sample of patches made by the toners of the printer of interest allows mapping to absolute color coordinates (such as L*a*b*)."

As disclosed in the cited references, automatic on-line color recalibration systems can be much more effective with an on-line color measurement system where a spectrophotometer may be mounted in the paper path of the moving copy sheets in the printer, preferably in the output path after fusing or drying, without having to otherwise modify the printer, or interfere with or interrupt normal printing, or the movement of the printed sheets in said paper path, and yet provide accurate color measurements of test color patches printed on the moving sheets as they pass the spectrophotometer. That enables a complete closed loop color control of a printer.

However, it should be noted that color measurements, and/or the use of color measurements for various quality or consistency control functions, are also important for many other different technologies and applications, such as in the production of textiles, wallpaper, plastics, paint, inks, etc. Thus, the disclosed color detection system may have applications in various such other fields where these materials or objects are to be color tested. Although the specific exemplary embodiment herein is part of a preferred automatic recalibration system with an on-line color printer color spectrophotometer, it will be appreciated that the disclosed spectrophotometer is not limited to that disclosed application.

By way of general background, studies have demonstrated that humans are particularly sensitive to spatial color variations. Typical full color printing controls, as well as typical color controls in other commercial industries, still typically utilize manual off-line color testing and frequent manual color adjustments by skilled operators. Both the cost and the difficulty of on-line use of prior color measurement apparatus and control systems, and the need for manual recalibration steps, has heretofore inhibited automation of many of such various commercial color testing and color adjustment systems. The disclosed lower cost spectrophotometer addresses both of those concerns.

By way of some examples of the construction or design of various other color spectrophotometers themselves, besides Xerox Corp. U.S. Pat. No. 5,748,221 above, and, especially, the above cross-referenced U.S. application Ser. No. 09/535,007, filed Mar. 23, 2000, by Fred F. Hubble, III and Joel A. Kubby, there is noted HP U.S. Pat. No. 5,671,059, issued 1993; and HP U.S. Pat. No. 5,272,518, issued Dec. 21, 1993; Accuracy Microsensor, Inc. U.S. Pat. Nos. 5,838,451 and 5,137,364, both issued to Cornelius J. McCarthy on Nov. 17, 1998 and Aug. 11, 1992, respectively; Color Savvy U.S. Pat. Nos. 6,147,761, 6,020,583, and 5,963,333; BYK-Gardner U.S. Pat. No. 5,844,680; and Colorimeter U.S. Pat. No. 6,157,454.

Some patents of interest relating to densitometers include U.S. Pat. Nos. 4,553,033; 4,989,985; and 5,078,497. Patents relating to providing uniform surface irradiance include U.S. Pat. No. 5,526,190.

As used in the patent claims and elsewhere herein, unless otherwise specifically indicated, the term "spectrophotometer" may encompass a spectrophotometer, colorimeter, and densitometer, as broadly defined herein. That is, the word "spectrophotometer" may be given the broadest possible definition and coverage in the claims herein, consistent with the rest of the claim. For example, various of the claims to a "spectrophotometer" in this application may encompass a similarly improved ETAC sensor densitometer used to measure the black or other color toner development on a moving photoreceptor surface or transfer belt. The definition or use of such above technical terms may also vary or differ among various scientists and engineers.

The following is an attempt to provide some simplified clarifications relating and distinguishing the respective terms "spectrophotometer," "colorimeter," and "densitometer," as they may be used in the specific context of specification embodiment examples of providing components for an on-line color printer color correction system, but not necessarily as claim limitations.

A typical "spectrophotometer" measures the reflectance of an illuminated object of interest over many light wavelengths. Typical prior spectrophotometers in this context use 16 or 32 channels measuring from 400 nm to 700 nm or so, to cover the humanly visible color spectra or wavelength range. A typical spectrophotometer gives color information in terms of measured reflectances or transmittances of light, at the different wavelengths of light, from the test surface. (This is to measure more closely to what the human eye would see as a combined image of a broad white light spectra image reflectance, but the spectrophotometer desirably provides distinct electrical signals corresponding to the different levels of reflected light from the respective different illumination wavelength ranges or channels.)

A "calorimeter" normally has three illumination channels, red, green and blue. That is, generally, a "colorimeter" provides its three (red, green and blue, or "RGB") values as read by a light sensor or detector receiving reflected light from a color test surface sequentially illuminated with red, green and blue illuminators, such as three different color LEDs or three lamps with three different color filters. It may thus be considered different from, or a limited special case of, a "spectrophotometer", in that it provides output color information in the trichromatic quantity known as RGB.

Trichromatic quantities may be used for representing color in three coordinate space through some type of transformation. Other RGB conversions to "device independent color space" (i.e., RGB converted to conventional L*a*b*) typically use a color conversion transformation equation, or a "lookup table" system, in a known manner. (Examples are provided in references cited herein, and elsewhere.)

A "densitometer" typically has only a single channel, and simply measures the amplitude of light reflectivity from the test surface, such as a developed toner test patch on a photoreceptor, at a selected angle over a range of wavelengths, which may be wide or narrow. A single illumination source, such as an IR LED, a visible LED, or an incandescent lamp may be used. The output of the densitometer detector is programmed to give the optical density of the sample. A densitometer of this type is basically "color blind". For example, a cyan test patch and magenta test patch could have the same optical densities as seen by the densitometer, but, of course, exhibit different colors.

A multiple LED reflectance spectrophotometer, as in the specific examples of the embodiments herein, may be considered to belong to a special case of spectrophotometers which normally illuminate the target with narrow band or monochromatic light. Others, with wide band illumination sources, can be flashed Xenon lamp spectrophotometers, or incandescent lamp spectrophotometers. A spectrophotometer is normally programmed to give more detailed, and broader spectra, reflectance values by using more than 3 channel measurements (e.g., 10 or more channel measurements), with conversion algorithms. That is in contrast to normal three channel calorimeters, which cannot give accurate, human eye related, reflectance spectra measurements, because they have insufficient measurements for that (only three measurements).

The spectrophotometer of the disclosed embodiments is especially suitable for being mounted at one side of the printed sheets output path of a color printer to optically evaluate color imprinted output sheets as they move past the spectrophotometer, variably spaced therefrom, without having to contact the sheets or interfere with the normal movement of the sheets. In particular, it may be used to measure a limited number of color test patch samples printed by the printer on actual printed sheet output of the printer during regular or selected printer operation intervals (between normal printing runs or print jobs). These color test sheet printing intervals may be at regular timed intervals, and/or at each machine "cycle-up," or as otherwise directed by the system software. The spectrophotometer may be mounted at one side of the paper path of the machine, or, if it is desired to use duplex color test sheets, two spectrophotometers may be mounted on opposite sides of the paper path.

Relatively frequent color recalibration of a color printer is highly desirable, since the colors actually printed on the output media (as compared to the colors intended to be printed) can significantly change, or drift out of calibration over time, for various known reasons. For example, changes in the selected or loaded print media, such as differences paper or plastic sheet types, materials, weights, calendaring, coating, humidity, etc. Or changes in the printer's ambient conditions, changes in the image developer materials, aging or wear of printer components, varying interactions of different colors being printed, etc. Printing test color patches on test sheets of the same print media under the same printing conditions during the same relative time periods as the color print job being color-controlled is thus very desirable.

It is thus also advantageous to provide dual-mode color test sheets, in which multiple color patches of different colors are printed on otherwise blank areas of each, or selected, banner, cover, or other inter-document or print job separator sheets. Different sets of colors may be printed on different banner or other test sheets. This dual use of such sheets saves both print paper and printer utilization time, and also provides frequent color recalibration opportunities where the printing system is one in which banner sheets are being printed at frequent intervals anyway.

An additional feature which can be provided is to tailor or set the particular colors or combinations of the test patches on a particular banner or other test sheet to those colors which are about to be printed on the specific document for that banner sheet, i.e., the document pages which are to be printed immediately subsequent to that banner sheet (the print job identified by that banner sheet). This can provide a "real time" color correction for the color printer which is tailored to correct printing of the colors of the very next document to be printed.

The preferred implementations of the systems and features disclosed herein may vary depending on the situation. Also, various of the disclosed features or components may be alternatively used for such functions as gray scale balancing, turning on more than one illumination source at once.

It will be appreciated that these test patch images and colors may be automatically sent to the printer imager from a stored data file specifically designed for printing the dual mode banner sheet or other color test sheet page, and/or they may be embedded inside the customer job containing the banner page. That is, the latter may be directly electronically associated with the electronic document to be printed, and/or generated or transmitted by the document author or sender. Because the printed test sheet color patches colors and their printing sequence is known (and stored) information, the on-line spectrophotometer measurement data therefrom can be automatically coordinated and compared.

After the spectrophotometer or other color sensor reads the colors of the test patches, the measured color signals may be automatically processed inside the system controller or the printer controller to produce or modify the tone reproduction curve, as explained in the cited references. The color test patches on the next test sheet may then be printed with that new tone reproduction curve. This process may be repeated so as to generate further corrected tone reproduction curves. If the printer's color image printing components and materials are relatively stable, with only relatively slow long term drift, and there is not a print media or other abrupt change, the tone reproduction curve produced using this closed loop control system will be the correct curve for achieving consistent colors for at least one or even a substantial number of customer print jobs printed thereafter, and only relatively infrequent and few color test sheets, such as the normal banner sheets, need be printed.

However, If there are substantial changes in the print media being used by the printer, or other sudden and major disturbances in the printed colors (which can be detected by the spectrophotometer output in response to the test patches on the next dual mode banner sheet or other color test sheet, or even, in certain instances, in the imprinted images) then the subsequent customer print job may have incorrect color reproduction. In these situations of customer print media changes in the printer (or new print jobs or job tickets that specify a change in print media for that print job), where that print media change is such that it may substantially affect the accuracy of the printed colors for that subsequent print job, it is not desirable to continue printing and then have to discard the next subsequent print jobs printed with customer unacceptable colors. In that situation it may be preferable in color critical applications to interrupt the normal printing sequence once the sudden color printing disturbance is detected and to instead print plural additional color test sheets in immediate succession, with different color test patch colors, to sense and converge on a new tone reproduction curve that will achieve consistent color printing for that new print media, and only then to resume the normal printing sequence of customer print jobs. Thus, the subsequent customer print jobs would then use the final, re-stabilized, tone reproduction curve obtained after such a predetermined number of sequential plural color test sheets have been printed.

This patent application is not related to or limited to any particular one of the various possible (see, e.g., various of the cited references) algorithms or mathematical techniques for processing the electronic signals from the spectrophotometer to generate or update color correction tables, tone reproduction curves, or other color controls, and hence they need not be further discussed herein.

Various possible color correction systems can employ the output signals of spectrophotometers, using various sophisticated feedback, correction and calibration systems, which need not be discussed in any further detail here, since the general concepts and many specific embodiments are disclosed in many other patents (including those cited herein) and publications. In particular, to electronically analyze and utilize the spectrophotometer or other electronic printed color output information with a feedback analysis system for the color control systems for a printer or other color reproduction system. It is, however, desirable in such systems to be able to use a substantially reduced (smaller) number of color patch samples, printed at intervals during the regular printing operations, to provide relatively substantially continuous updating correction of the printer's color renditions over a wide or substantially complete color spectra. Noted especially in that regard is the above-cited Xerox Corp. Steven J. Harrington U.S. Pat. No. 6,178,007 B1.

Color correction and/or color control systems should not be confused with color registration systems or sensors. Those systems are for insuring that colors are correctly printed accurately superposed and/or accurately adjacent to one another, such as by providing positional information for shifting the position of respective color images being printed.

Other background patents which have been cited as to color control or correction systems for printers include the following U.S. patents: Xerox Corp. U.S. Pat. No. 5,963, 244, issued Oct. 5, 1999 to L. K. Mestha, et al, entitled "Optimal Reconstruction of Tone Reproduction Curve" (using a lookup table and densitometer readings of photoreceptor sample color test patches to control various color printer parameters); U.S. Pat. No. 5,581,376, issued December 1996 to Harrington; U.S. Pat. No. 5,528,386, issued Jun. 18, 1996 to Rolleston et al.; U.S. Pat. No. 4,275,413, issued Jun. 23, 1981 to Sakamoto et al.; U.S. Pat. No. 4,500,919, issued Feb. 19, 1985 to Schreiber; U.S. Pat. No. 5,416,613, issued May 16, 1995 to Rolleston et al.; U.S. Pat. No. 5,508,826, filed Apr. 27, 1993 and issued Apr. 16, 1996 to William J. Lloyd et al.; U.S. Pat. No. 5,471,324, issued Nov. 28, 1995 to Rolleston; U.S. Pat. No. 5,491,568, issued Feb. 13, 1996 to Wan; U.S. Pat. No. 5,539,522, issued Jul. 23, 1996 to Yoshida; U.S. Pat. No. 5,483,360, issued Jan. 9, 1996 to Rolleston et al.; U.S. Pat. No. 5,594,557, issued January 1997 to Rolleston et al.; U.S. Pat. No. 2,790,844 issued April 1957 to Neugebauer; U.S. Pat. No. 4,500,919, issued February 1985 to Schreiber; U.S. Pat. No. 5,491,568, issued Feb. 13, 1996 to Wan; U.S. Pat. No. 5,481,380 to Bestmann, issued Jan. 2, 1996; U.S. Pat. No. 5,664,072, issued Sep. 2, 1997 to Ueda et al.; U.S. Pat. No. 5,544,258, issued Aug. 6, 1996 to Levien; and U.S. Pat. No. 5,881,209, filed Sep. 13, 1994 and issued Mar. 9, 1999 to Michael Stokes.

By way of further background on the subject of technology for automatic color correction for color printers or other reproduction apparatus, especially such systems utilizing feedback signals from a colorimeter or spectrophotometer (as noted, those terms may be used interchangeably herein), and/or automatically measuring the actually printed colors of test patches on printed copy sheets as they are being fed through the output path the printer, there is noted the following: the above-cited Xerox Corp. U.S. Pat. No. 5,748, 221, filed Nov. 1, 1995 and issued May 5, 1998 to V. Castelli, et al, entitled "Apparatus for Colorimetry, Gloss and Registration Feedback in a Color Printing Machine," (noting especially the calorimeter detector details); the above-cited Apple Computer, Inc. U.S. Pat. No. 5,612,902, issued Mar. 18, 1997 to Michael Stokes; Xerox Corp. U.S. Pat. No. 5,510,896, issued Apr. 23, 1996 to Walter Wafler, filed Jun. 18, 1993 (see especially Col. 8 re color calibration from information from a scanned color test copy sheet as compared to original color image information); and Xerox Corp. U.S. Pat. No. 5,884,118, issued Mar. 16, 1999 to Mantell and L. K. Mestha, et al, entitled "Printer Having Print Output Linked to Scanner Input for Automated Image Quality Adjustment" (note especially Col. 6 lines 45–49).

U.S. Patents of interest to color correction in general, but which may be useful with, or provide background information for, the above or other systems, include the above-cited Xerox Corp. U.S. Pat. No. 5,594,557, filed Oct. 3, 1994 and issued Jan. 14, 1997 to R. J. Rolleston et al., entitled "Color Printer Calibration Correcting for Local Printer Non-Linearities;" Seiko Epson Corp. U.S. Pat. No. 5,809,213, provisionally filed Feb. 23, 1996 and issued Sep. 15, 1998 to A. K. Bhattacharjya re reduced color measurement samples; and Splash Technology, Inc. U.S. Pat. No. 5,760,913 filed Feb. 12, 1996 and issued Jun. 2, 1998 to Richard A. Falk in which a calibration image is scanned using a scanner coupled to the printing system with a personal computer.

In addition to above-cited issued patents, also noted as of possible interest to on-line color printer color control or correction systems (other than spectrophotometers per se) are Xerox Corp. U.S. Applications including: U.S. application Ser. No. 09/083,202, filed May 22, 1998 by Mark A. Scheuer, et al., entitled "Device Independent Color Controller and Method," Attorney Docket No. D/97695; U.S. application Ser. No. 09/083,203, filed May 22, 1998 by Lingappa K. Mestha, entitled "Dynamic Device Independent Image," Attorney Docket No. D/98203 (now U.S. Pat. No. 6,157, 469, issued Dec. 5, 2000); U.S. application Ser. No. 09/232, 465, filed Jan. 19, 1999 by Martin E. Banton, et al., entitled "Apparatus and Method for Using Feedback and Feedforward in the Generation of Presentation Images in a Distributed Digital Image Processing System," Attorney Docket No. D/98423; U.S. application Ser. No. 09/221,996, filed Dec. 29, 1998 by Lingappa K. Mestha, et al., entitled "Color Adjustment Apparatus and Method," Attorney Docket No. D/98428; U.S. application Ser. No. 09/455,761, filed Dec. 7, 1999 by Sidney W. Marshall, et al., entitled "Color Gamut Mapping for Accurately Mapping Certain Critical Colors and Corresponding Transforming of Nearby Colors and Enhancing Global Smoothness," Attorney Docket No. D/99087; U.S. application Ser. No. 09/487,586, filed Jan. 19, 2000 by Lingappa K. Mestha, et al., entitled "Methods For Producing Device and Illumination Independent Color Reproduction," Attorney Docket No. D/99159; U.S. application Ser. No. 09/451,215, filed Nov. 29, 1999 by Lingappa K. Mestha, et al., entitled "On-Line Model Prediction and Calibration System For A Dynamically Varying Color Marking Device," Attorney Docket No. D/99508; U.S. application Ser. No. 09/454,431, filed Dec. 3, 1999, by Tracy E. Thieret, et al., entitled "On-Line Piecewise Homemorphism Model Prediction, Control and Calibration System for a Dynamically Varying Color Marking Device," Attorney Docket No. D/99577Q; U.S. application Ser. No. 09/461,072, filed Dec. 15, 1999 by Lingappa K. Mestha, et al., entitled "Systems and Methods for Device Independent Color Control to Achieve Accurate Color Proofing and Reproduction," Attorney Docket No. D/99627; U.S. application Ser. No. 09/562,072, filed May 1, 2000 by Lingappa K. Mestha, et al., entitled "System and Method for Reconstruction of Spectral Curves, Using Measurements from a Color Sensor and Statistical Techniques," Attorney Docket No. D/99803; U.S. application Ser. No. 09/621,860, filed Jul. 21, 2000 by Lingappa K. Mestha, et al., entitled "System and Method for Reconstruction of Spectral Curves Using Measurements from a Color Sensor and a Spectral Measurement System Model," Attorney Docket No. D/A0098; and U.S. application Ser. No. 09/566,291, filed May 5, 2000 by Lingappa K. Mestha, et al., entitled "On-Line Calibration System For A Dynamically Varying Color Marking Device," Attorney Docket No. D/A0102.

As further well-known background for on difficulties in color correction of printers in general, computers and other electronic equipment generating and inputting color images or documents typically generate three-dimensional or RGB (red, green, blue) color signals. These color signals may be transmitted as PDL or other device independent terms to a specific server or printer for a "RIP" (raster image process) conversion to device dependent color values, such as for the line and bit signals for the laser scanner or LED bar of the particular printer. Many printers, however, can receive four-dimensional or CMYK (cyan, magenta, yellow, and black) signals as input, and/or can print with four such print colors (although the printed images can still be measured as corresponding RGB values). A look-up table is commonly provided to convert each digital RGB color signal value to a corresponding digital CMYK value before or after being received by the printer.

Real-world printers inherently have non-ideal printing materials, colors and behaviors, and therefore have complex non-linear colorimetric responses. Also, interactions between the cyan, magenta, and yellow imaging materials exist, especially on the printed output, which result in unwanted or unintended absorptions and/or reflections of colors. Even after a printer is initially calibrated, such that one or a range of input digital CMYK values produce proper colors, the full spectrum of CMYK values and printed colors will not be or remain fully accurate. In other words, the colors requested or directed to be printed by various input signals will not be the same as the actual colors printed.

This discrepancy arises in part because the relationship between the digital input values that drive the printer and the resulting calorimetric response is a complex non-linear function. Labeling the response, or other values, as "colorimetric" can indicate that the response or value has been measured by such an instrument. Adequately modeling the colorimetric response of a printer to achieve linearity across the entire available spectrum requires many parameters. Typically, a color correction look-up table is built which approximates the mapping between RGB colorimetric space and CMYK values, as taught in various of the above-cited references. Each RGB coordinate may be typically represented by an 8-bit red value, an 8-bit green value, and an 8-bit blue value. Although those RGB coordinates are capable of addressing a look-up table having $256^3$ locations, measuring and storing $256^3$ values is time consuming and expensive. The look-up table is thus typically partitioned into a smaller size such as 16×16×16 (4096) table locations, each of which stores a four-dimensional CMYK value. Other CMYK values may then be found by interpolating the known CMYK values using an interpolation process, for example, trilinear or tetrahedral interpolation.

The color correction look-up table may be built by sending a set of CMYK digital values to the printer, measuring the colorimetric RGB values of the resulting color patches outputted by the printer with a spectrophotometer, and generating the look-up table from the difference between the inputted values and the measured outputted values. More specifically, the color correction look-up table corrects for non-linearities, printing parameter variations, and unwanted absorptions of inks, so that the printer will print the true corresponding color.

After the color correction table is generated, the actual printer response may tend to drift over time. To correct for the drift, the system is adjusted or recalibrated periodically. Recalibrating the color correction table involves periodically printing and remeasuring a set of test color patches which are then compared to an original set of color patches by calibration software. Remeasuring, however, has heretofore more typically been performed manually by a scanner or other measuring device which is remote from the printer being recalibrated. For example, by removing a test output sheet from the printer output tray, placing it (stationary) on a table and sliding a spectrophotometer over it, manually or with an X-Y plotter driver, or automatically feeding the test sheet through the spectrophotometer, and storing the spectrophotometer output signals data in an associated memory to read out later, or, connecting the spectrophotometer by an electrical wire or cable to the printer controller or its server to directly receive those color recalibration electrical input signals from the spectrophotometer and process them as described. The connecting cable could be replaced by known IR or RF wireless (such as "BlueTooth") connection systems, as used in PC and other electronic components connections. However, this off-line manual testing of calibration sheets assumes that the operator can properly manually identify and measure the test color sheets or patches being tested in the correct order, from the correct machine. Once a color correction table is generated, it must be associated with the correct printer, otherwise, a different printer will be recalibrated with an incorrect correction table. An automatic, on-line, dedicated spectrophotometer color correction system does not have these problems or potential error sources.

It will be appreciated that although the specific embodiment herein is described with particular reference to such desirable applications for calibrating and/or regularly re-calibrating color printers and/or refining color correction tables, that what is disclosed herein may also find various other applications in other color testing and correction systems and industries.

As discussed, in high quality color reprographic applications, it is highly advantageous to monitor and update system calorimetric performance on-line and automatically through the use of an integrated spectrophotometer. That is, to have the printing device automatically fairly frequently generate calibration prints on otherwise normally printed sheets with color patches based on digital test pattern generations, and to have a spectrophotometer in the printer output which can read those moving sheet printed color test patches accurately to provide printed output color measurement signals, without manual intervention or printing interference. This requires a relatively low cost, yet fast, accurate, and wide spectral range spectrophotometer capable of effectively operating in that environment, and under those conditions, without interfering with normal printing operations. That is, being of sufficiently low cost such that this enhanced feature can be provided on commercial color printers without substantially increasing the total customer cost of those printers. That is not typical for conventional laboratory spectrophotometers. The disclosed spectrophotometer embodiment may be positioned at any convenient location along the normal paper path of a printing machine. It may even be fitted into the output sheet stacker tray of various existing color printers.

A specific feature of the specific embodiment disclosed herein is to provide a color correction system for a color printer having an output path for moving printed color sheets, including printed test sheets with printed color test patches, in which a spectrophotometer is mounted adjacent to said printer output path for sensing the colors printed on said printed color test patches on said printed test sheets as said printed test sheets are moving past said spectrophotometer in said output path, said color correction system including plural illumination sources for sequentially illuminating said color test patches with different illumination spectra in a substantially circular illumination pattern, and a plural photodetectors system for providing electrical output signals in response to the color of said test patches from said sequential illumination of said test patches by reflection of said illumination of said color test patches in said substantially circular illumination pattern by said illumination sources, and a plural lens system for transmitting said reflected illumination from said color test patches to said plural photodetectors system, so as to provide improved angular displacement insensitivity of said spectrophotometer relative to said printed test sheets.

Further specific features disclosed herein, individually or in combination, include those wherein said plural photodetectors system comprises a plurality of photodetectors angularly spaced around said substantially circular illumination pattern to receive reflected illumination therefrom at substantially the same angle substantially from opposing directions; and/or wherein a common central lens system is provided, and wherein said different illumination spectra from said plural illumination sources for sequentially illuminating said color test patches in a substantially circular illumination pattern are perpendicularly aimed by said central lens system at substantially the same area of said color test patches on said printed test sheets to provide said substantially circular illumination pattern thereof; and/or wherein said plural illumination sources comprise a plurality of closely adjacent different spectral emission LEDs with a sequential actuation circuit; and/or a low cost broad spectrum spectrophotometer for measuring the colors of test target areas which may be variably displaced and variably angularly oriented relative to said spectrophotometer, comprising plural illumination sources and a common lens system for sequentially projecting plural different spectral illuminations from said plural illumination sources substantially perpendicular to the color test target area to illuminate a substantially circular illumination area of the color test target area, a sequential actuation circuit for sequentially actuation of said plural illumination sources, and at least one photodetector spaced from said common lens system and spaced from said substantially circular illumination area of the color test target area to angularly receive reflected light from said substantially circular illumination area, so as to provide reduced angular displacement sensitivity of said spectrophotometer relative to said color test target area; and/or wherein said at least one photodetector comprises a detector array of plural photodetectors spaced apart on at least two opposing sides of said common lens system and spaced from said substantially circular illumination area of the color test target area to differently angularly receive reflected light from said substantially circular illumination area at substantially the same angle from opposing directions, so as to provide additionally reduced angular displacement sensitivity of said spectrophotometer relative to said color test target area; and/or wherein said plural illumination sources comprise approximately eight or less LEDs providing a correspondingly limited number of different spectral illuminations; and/or wherein said spectrophotometer is a part of a color control system of a color printer with a printed sheets output path and is mounted adjacent to at least one side of the printed sheets output path of said color printer and said illuminated color test target area is printed on a printed color test sheet printed by said printer and moving past said spectrophotometer in said printed sheets output path of said color printer; and/or wherein said limited plurality of illumination sources comprises less than approximately five LEDs providing a corresponding limited number of different spectral illuminations, and said at least one photodetector comprises a photodetector with plural photo-sites and plural different spectral responses; and/or wherein there are approximately four or less said plural photodetectors; and/or wherein said plural photodetectors are mounted in a substantially circular pattern surrounding said common lens system to define a central axis; and/or wherein said plural photodetectors each have a projection lens system having approximately 1:1 imaging optics; and/or a method of broad spectrum color measurement of a color test area comprising substantially perpendicularly sequentially illuminating a substantially circular area of said color test area with a limited plural number of different spectra illuminations through a common lens system and sequentially non-contact measuring a portion of the reflected illumination from said sequentially illuminated substantially circular area of said color test area at approximately 45 degrees thereto with at least one photodetector spaced from said color test area to provide reduced angular insensitivity of said photodetector relative to said color test area; and/or the method of broad spectrum color measurement of a color test area, utilizing a detector array comprising plural photodetectors mounted on opposing sides of said color test area, the outputs of which are averaged to reduce said angular insensitivity relative to said color test area; and/or wherein said plural photodetectors each receive said reflected illumination through a projection lens system having an approximately 1:1 imaging ratio to provide relative displacement insensitivity of said photodetectors relative to said color test area; and/or a low cost broad spectrum spectrophotometer comprising means for sequentially perpendicularly illuminating a common substantially circularly illuminated color test area with a limited plural number of different spectra illuminations, and means for sequentially measuring the angularly reflected illumination from said sequentially illuminated substantially circularly illuminated color test area by applying said reflected illumination simultaneously to plural photodetectors spaced around said common color test area and summing the outputs of said photodetectors to provide an averaged output; and/or wherein said limited plural number of different spectra illuminations is provided by a plurality of different LEDs in a common area with a common shared lens system and a sequential actuation circuit for said LEDs.

The disclosed system may be connected, operated and controlled by appropriate operation of conventional control systems. It is well-known and preferable to program and execute various control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

In the description herein the term "sheet" refers to a usually flimsy (non-rigid) physical sheet of paper, plastic, or other suitable physical substrate or print media for images, whether precut or web fed. A "copy sheet" may be abbreviated as a "copy," or called a "hardcopy." Printed sheets may be referred to as the "output." A "print job" is normally a set of related printed sheets, usually one or more collated copy sets copied from a one or more original document sheets or electronic document page images, from a particular user, or otherwise related.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of a specific embodiment, including the drawing figures (approximately to scale, except for schematics) wherein:

Figure 1:
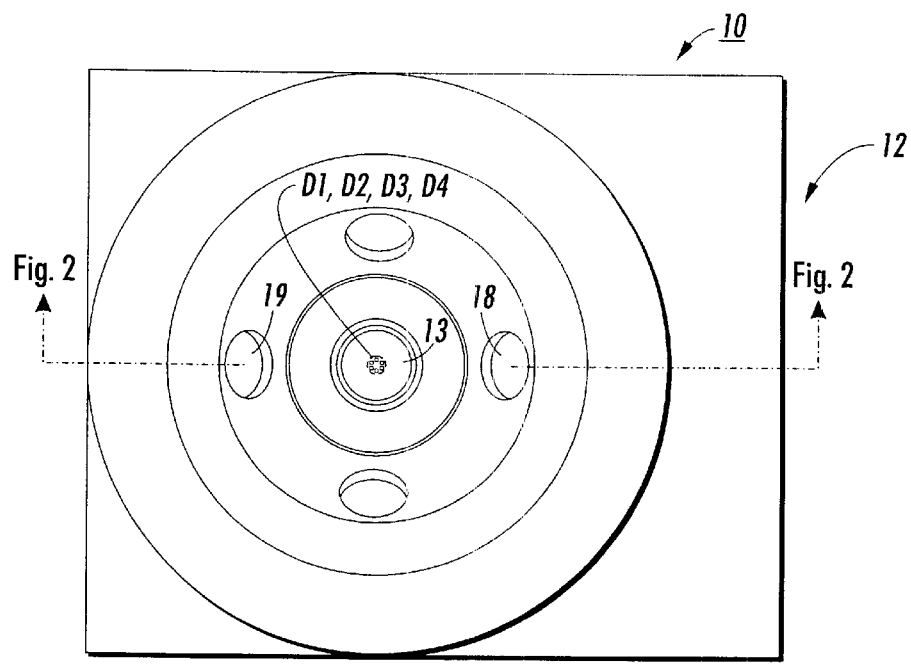
FIG. 1 is a top view of one example or embodiment of a spectrophotometer incorporating one example of the present invention.
Figure 2:
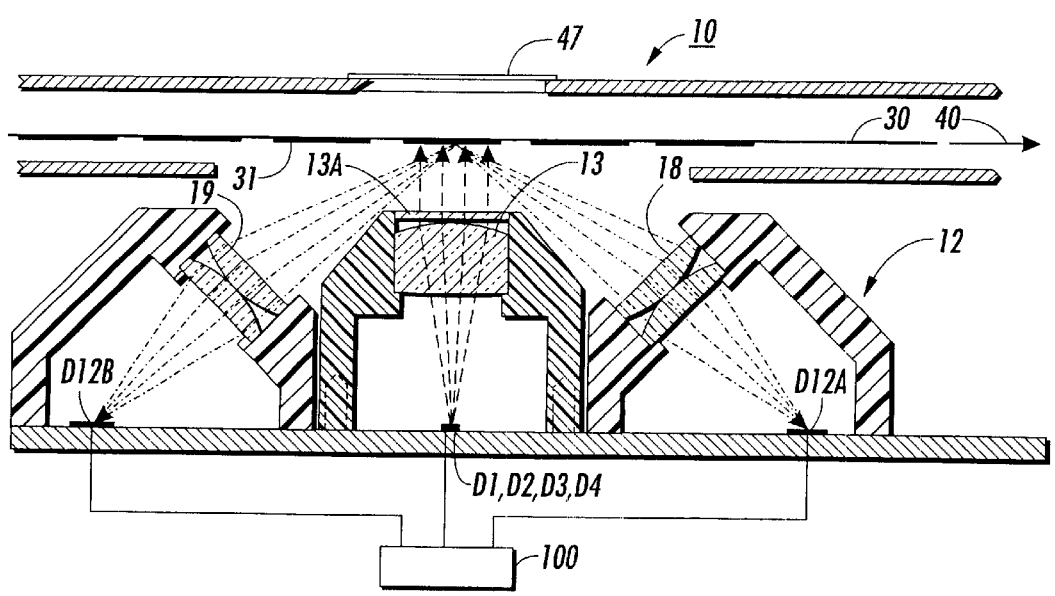
FIG. 2 is a cross-sectional view taken along the line 2—2 of the spectrophotometer of FIG. 1 shown measuring the color of a test patch of a test sheet moving in an exemplary color printer output path.
Figure 3:
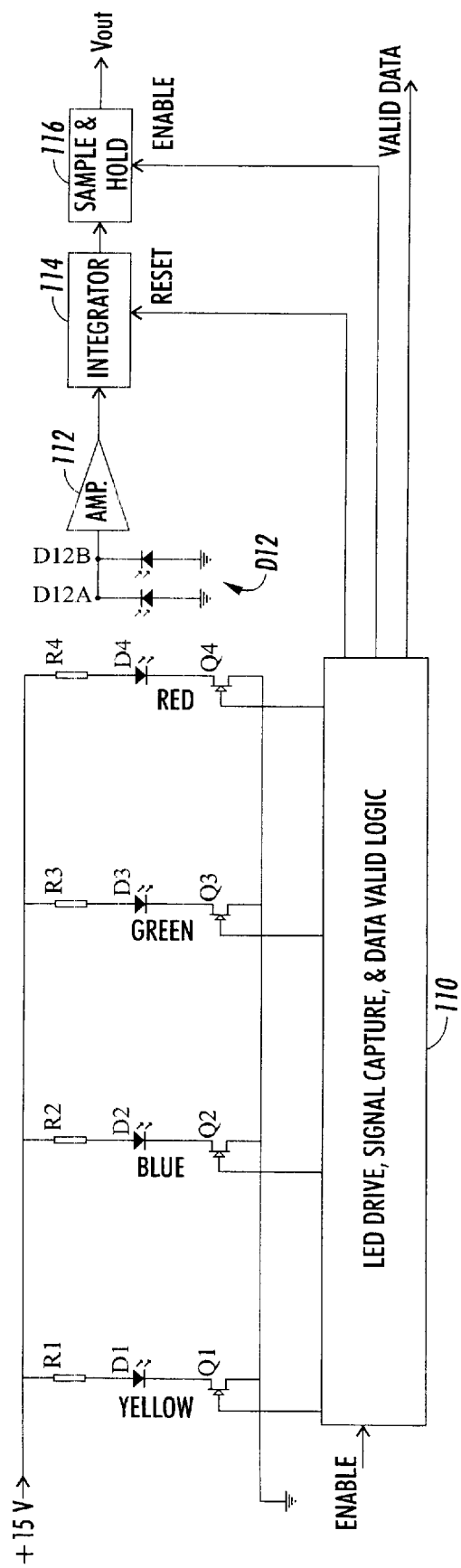
Figure 4:
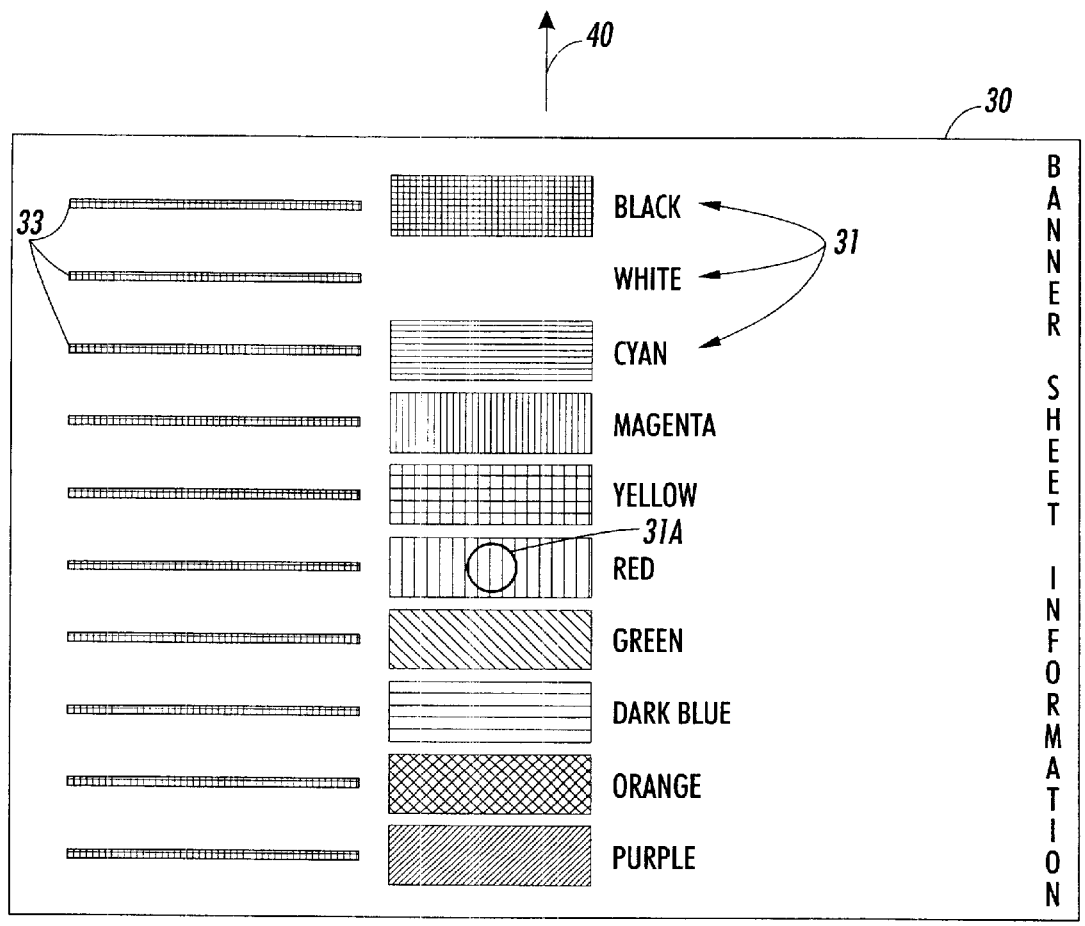
Figure 5:
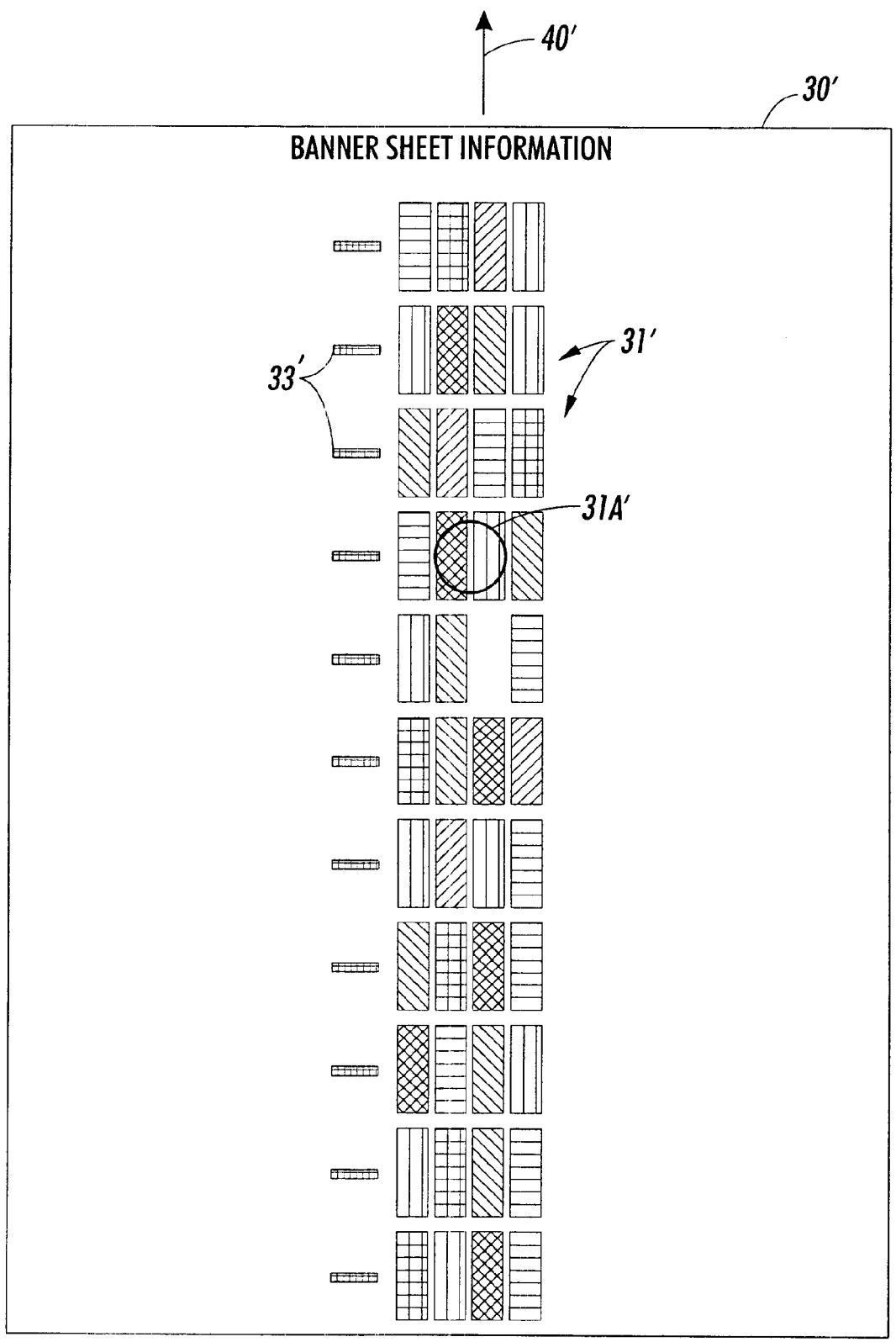
Figure 6:
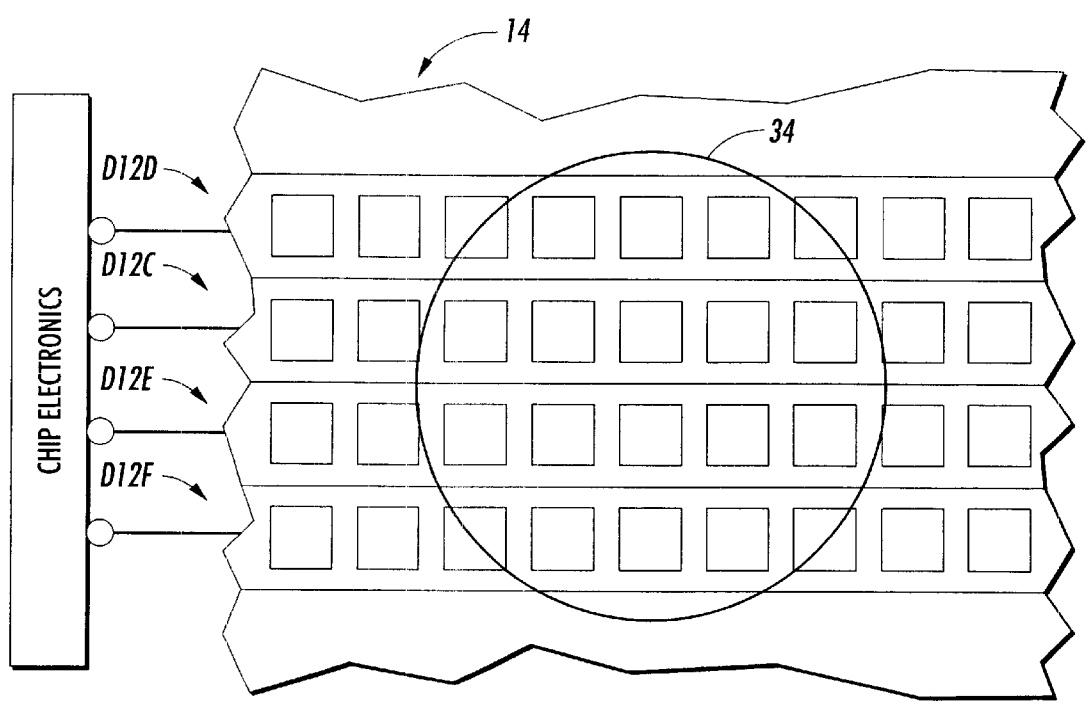
Figure 7:
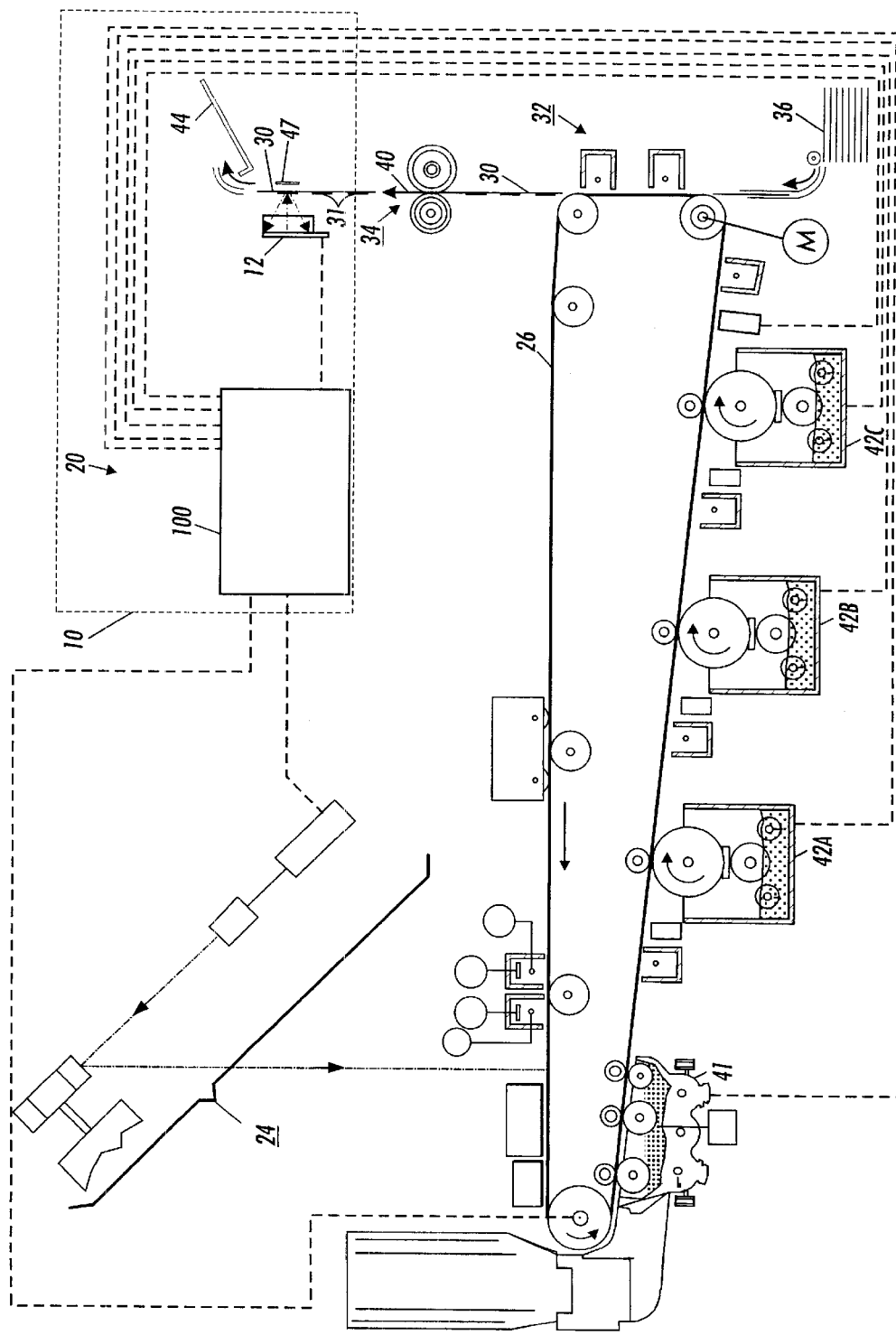
Figure 8:
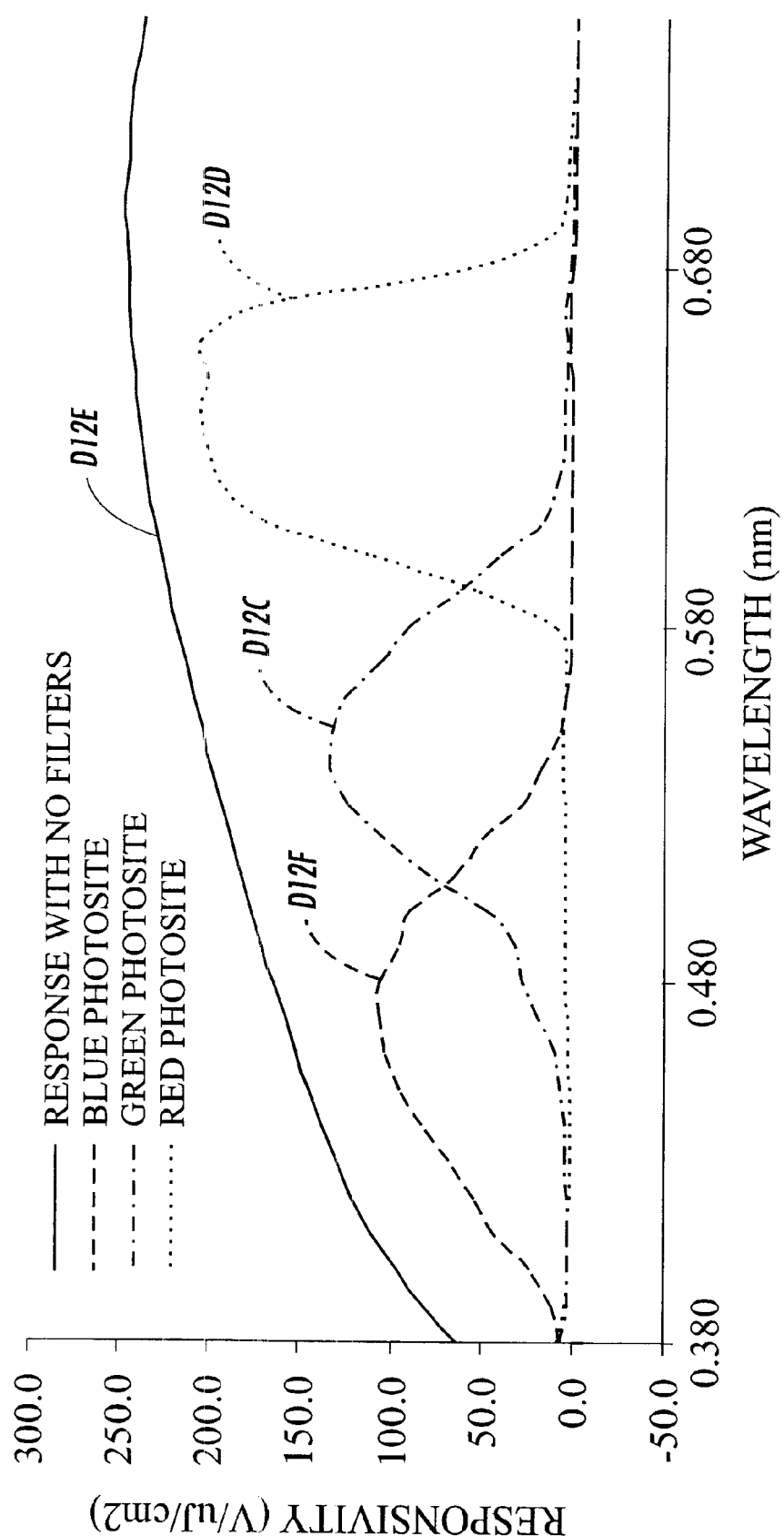
Figure 9:
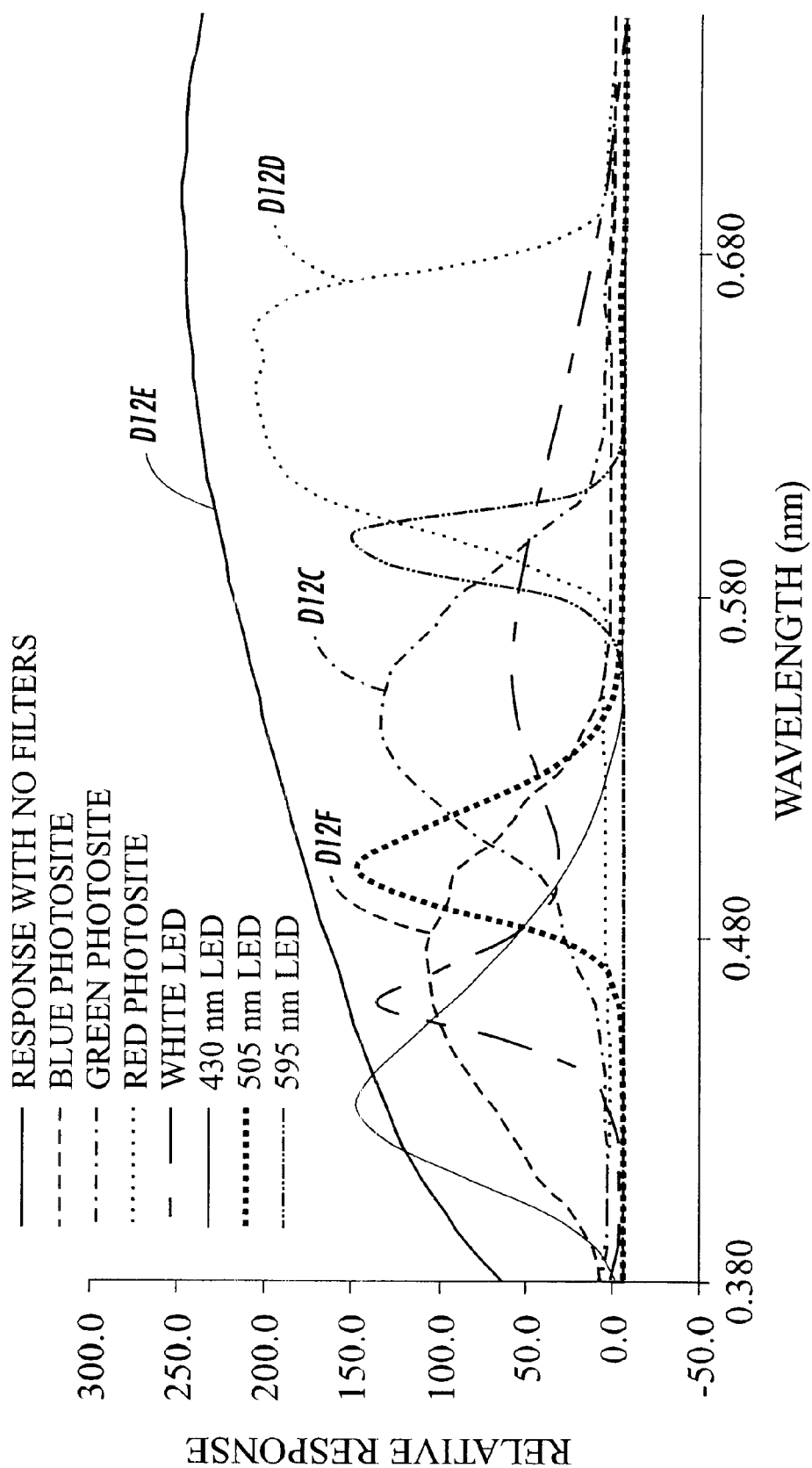
Figure 10:
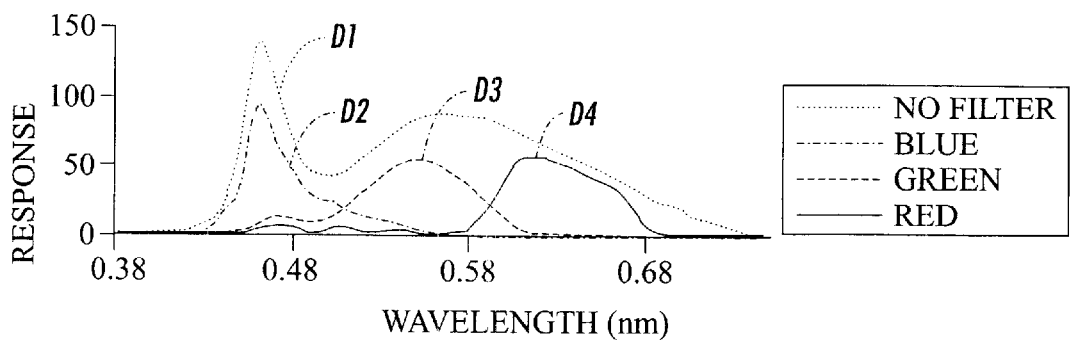
Figure 11:
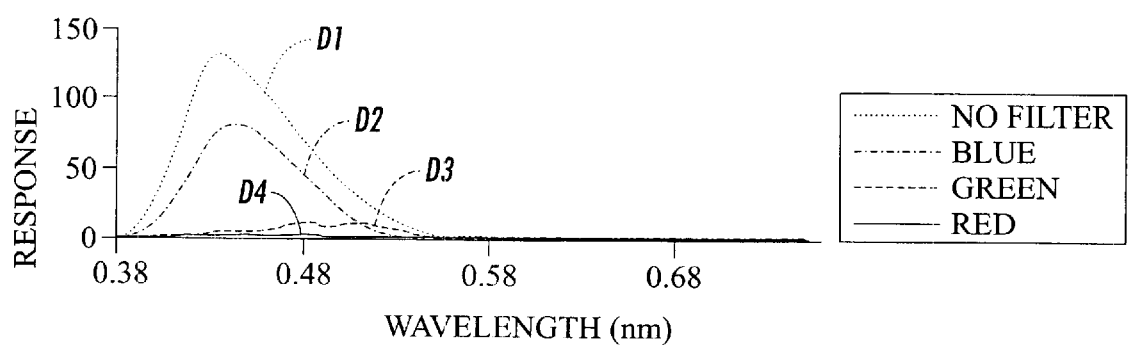
Figure 12:
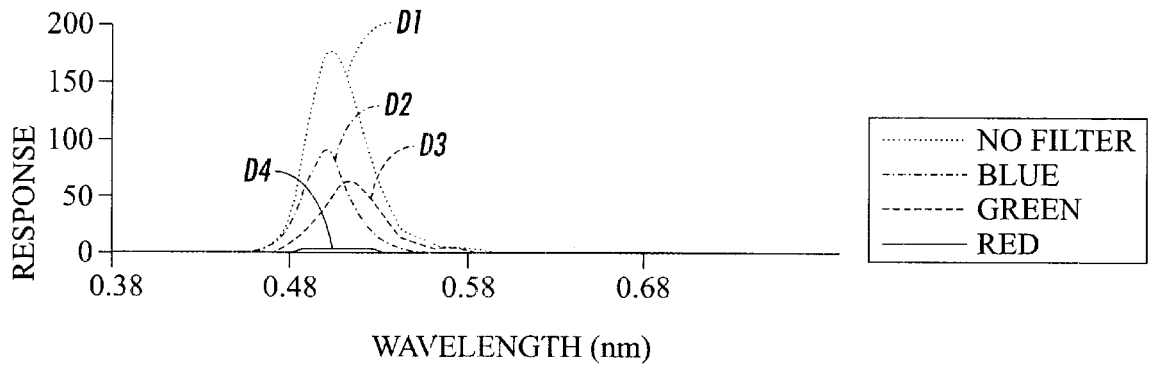
Figure 13:
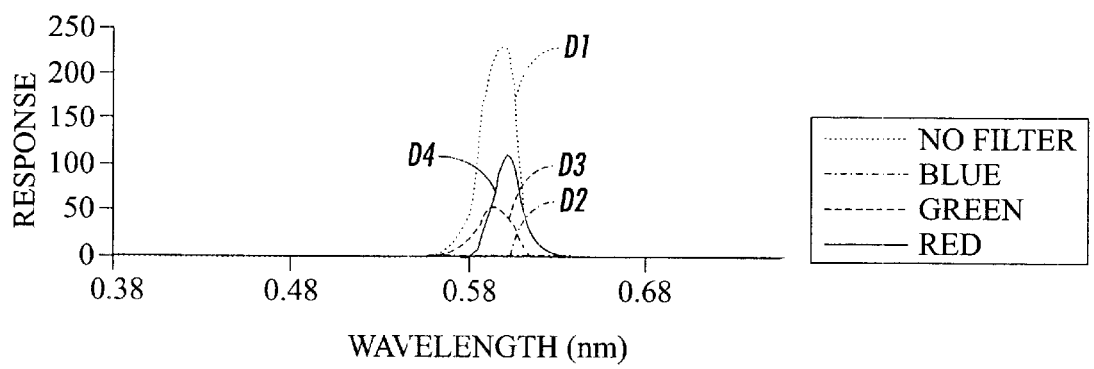
Figure 14:
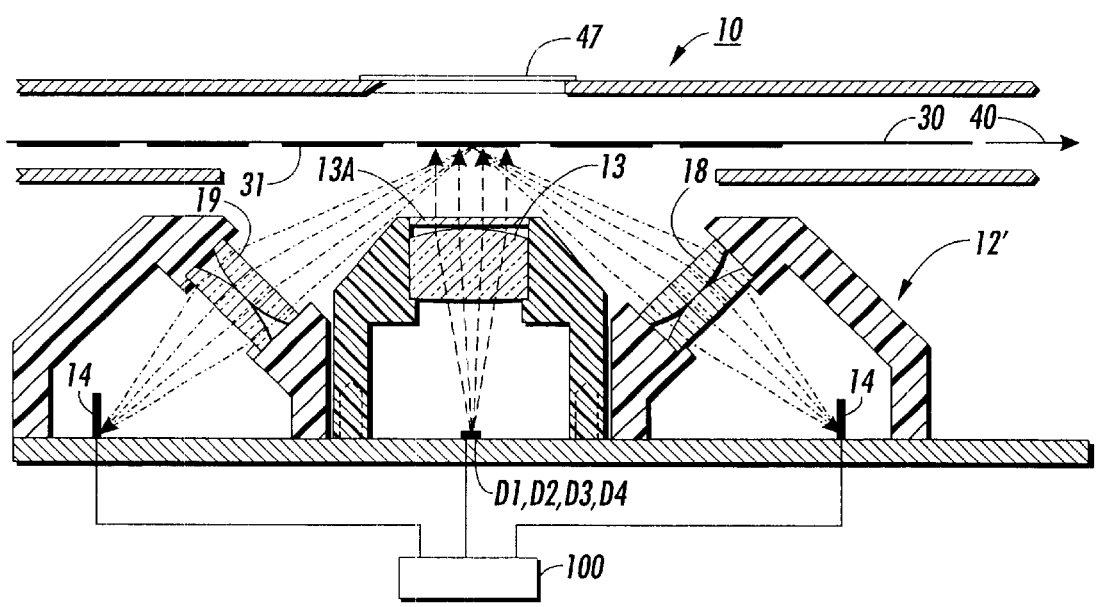

FIG. 3 schematically shows one example of circuitry with which the exemplary spectrophotometer of FIGS. 1 and 2 may be operated;

FIGS. 4 and 5 show two examples of a banner or other test sheet which may be printed by an exemplary color printer with plural color test patches to be read by the spectrophotometer of FIGS. 1 and 2 or 14, with the different colors represented by their U.S. Patent Office standard black and white cross-hatching symbols;

FIG. 6 is a schematic and greatly enlarged partial plan view of an optional photodetector which may be utilized in the exemplary spectrophotometer of FIGS. 1 and 2 as modified as shown in FIG. 14, comprising an exemplary silicon color image sensor array chip (normally part of a commercially available document imaging bar) with three rows of photosensor sites transmissively filtered red, green and blue, respectively, in a known manner, for respectively sensing spectra in those three separate colors, and also showing an (optional) fourth row of photosensor sites without filters for white light sensing, with the area defined by the circle illustrated thereon representing an exemplary area of this sensor array chip being illuminated by LED source light reflected by a test target;

FIG. 7 schematically shows in a plan view one example of an otherwise conventional color printer, shown printing the color test sheets of FIG. 4 or 5 and sequentially reading those test sheets with the spectrophotometer of FIGS. 1 and 2 or 14, as the test sheets are moving normally in the normal output path of this printer, with the spectrophotometer shown mounted at one side of that sheet output path opposite from a calibration test target surface;

FIG. 8 shows in a plot of wavelength (horizontal) versus relative response (vertical) the four exemplary spectral responses of the exemplary image sensor array chip of FIG. 6, respectively for its unfiltered sensors (the solid line), blue filtered sensors (the dashed line), green filtered sensors (the dot-dashed line) and red filtered sensors (the dotted line);

FIG. 9 is similar to FIG. 8 but shows superimposed on the curves of FIG. 7 the spectral outputs of four different exemplary LED illumination sources which may be integral to the exemplary spectrophotometer of FIG. 14 (as described and shown in the table below), namely a white LED (the dash-long-dash line), a 430 nm LED (the thin line), and 505 nm LED (the line of squares), and a 595 nm LED (the dash-dot-dot dash line);

FIGS. 10, 11, 12 and 13 respectively sequentially show the combined response of all four different photo-sites of the sensor chip of FIG. 6 as sequentially exposed to illumination from only one of the four different LEDs of FIG. 9., namely, in FIG. 10 the white LED, in FIG. 11 the 430 nm LED, in FIG. 12 the 505 nm LED, and in FIG. 13 the 595 nm LED; and FIG. 14 is a modified version of FIG. 2 in which the multiple photo-sites photodetectors of FIG. 6 are mounted perpendicularly to the color test target area for receiving a circular image. This perpendicular orientation of the photodetector chip puts it in the image plane of its optics and thereby minimizes image distortion.

We will now refer in further detail to the specific exemplary embodiment of a color sensing system 10 with spectrophotometer embodiments 12 or 12' as shown in the above-described Figures, for testing color test areas. Unless indicated otherwise, herein the references to the spectrophotometer 12 of FIG. 2 also apply to the spectrophotometer 12' of FIG. 14. Likewise, test references to FIG. 4 reference numbers 30, 31, 31A and 33 will apply to the FIG. 5 references 30', 31', 31A' and 33'. As variously previously discussed, this spectrophotometer 12 embodiment (or alternatives thereof) is particularly suited to be part of a highly effective yet economical on-line or "real time" color printing color calibration or correction system, which can regularly measure the actual colors currently being printed by a color printer such as 20 of FIG. 7 on banner or other printed test sheets such as 30 of FIG. 4 or 30' of FIG. 5, as compared to the intended or selected, or "true" colors of the electronic document images being inputted to the printer 20 for printing. However, as also noted above, the disclosed spectrophotometer 12 is not limited to that disclosed combination, application or utility.

The azmuthal insensitivity features of this spectrophotometer 12 embodiment are shown and described herein combined with displacement insensitivity features thereof which are also the subject of said above cross-referenced copending commonly owned U.S. application Ser. No. 09/535,007 filed Mar. 23, 2000, by the same Fred F. Hubble, III and Joel A. Kubby. The principles of those displacement insensitivity features will be re-explained below in relation with the different spectrophotometer 12 here.

As noted in said copending application, it is desirable to reduce variations in the spectrophotometer output with variations in the target displacement distance. However, achieving improvement in either or both displacement insensitivity and azmuthal insensitivity is complicated when it is desired to measure reflectivity from a test area illuminated at 45 degrees relative thereto.

Although not essential, it is very desirable to be compatible with industry standards set forth by the CIE, ASTM, and others, in which the test patch illumination for color measurement should be at 45 degrees to the surface of the media on which the color test patch is printed. Also for these standards the color test patch measurement should be performed using flux diffusely scattered from the (so-illuminated) test patch at 90 degrees (perpendicular) to that color test patch surface. A significant challenge in implementing a spectrophotometer to that standard is the repeatable collection of the reflected flux, as the amount of flux collected is proportional to the solid angle subtended by the entrance pupil of the flux collection optics. However, it has been found that these standards can be met by the different architecture spectrophotometer 12 here, which instead illuminates the test surface at 90 degrees, and makes the color measurements of reflected light at 45 degrees to that illuminated test surface.

As noted, prior spectrophotometers, calorimeters, and densitometers required that the measured target be held in a fixed predetermined position during measurement, typically accomplished by physically pressing the target material flat against a reference surface attached or held closely adjacent to the device's sense head.

In contrast, the position of print media in most existing printer paper paths, in the direction perpendicular to the paper path plane, is relatively uncontrolled in much of the paper path, since the paper normally is moved in between baffles which are much more widely spaced apart than the paper thickness, preferably by several millimeters, as illustrated here in FIG. 2. The paper may even be deliberately corrugated by corrugating feed rollers.

As the displacement between a sensor and the sensed media varies, the amount of flux collected will vary in a corresponding manner according to the following equation:

$$E \propto \Omega = A/r^2$$

Where $\Omega$=the solid angle subtended by the projection optics,

A=the area of the projection optics entrance pupil, and r=the displacement between the test patch and the entrance optic.

As displacement changes; the amount of flux collected varies, and this variation will be indistinguishable at the electrical signal output from variations in the density of the patch, which will lead to errors in the measured density if not compensated for.

One solution would be to mechanically constrain the media in the measurement nip by means of additional apparatus in the paper path. However, as noted above, this is highly undesirable because of the increased cost associated with additional components, and the probable increase in jams due to the constriction in the paper path.

The solution disclosed here is to instead provide a novel spectrophotometer 12 which is relatively insensitive to the relative displacement between the spectrophotometer and the color target media it is measuring. This is far more desirable, as it minimizes interference with the media, allows architectural versatility in the placement of the sensor, and, if done correctly, need add only a small increment in sensor UMC. There is provided here a spectrophotometer 12 whose output is relatively insensitive to the displacement from the surface of the media under interrogation, yet which is compact and relatively inexpensive and thus suitable for cost-effective deployment in the regular (and unrestricted) output paper paths of conventional reprographic machines.

As otherwise described herein, in the spectrophotometer 12 of FIG. 2 flux from a selected sequential light source such as D1, D2, D3, or D4 (the particular light source being illuminated at that time) is shown being collimated by a common condensing lens 13 (with an IR filter 13A) and applied to a test patch 31 on the print media 30. An inverted image of the illuminated area is formed at the plane of the detectors D12 (D12A and D12B in FIG. 2) by projection (target) optics 18 and 19, which overfills the areas of the detectors D12. By selecting the magnification of that target optic 18 and 19 to be 1:1, it has been discovered that, to the first order, and for object to sensor displacement variations that are small relative to the total conjugate, the energy density in the image detected by the detector will be invariant to the spacing between the media and the sense head, as will be explained. Light energy reflected from the test patch 31 which is collected by the lenses 18 and 19 is proportional to the solid angle subtended by that projection lens. Mathematically, as the media to optic displacement, r (not shown), varies, the total energy in the image varies by the solid angle, which is proportional to $r^{(-2)}$. Variation in the media to sensor spacing also affects the image size in a corresponding and compensating manner. For 1:1 imaging optics, magnification varies as the inverse of the displacement, $r^{(-1)}$, which produces a change in the image area proportional to $r^{(-2)}$. Thus the image energy density, i.e. energy per unit area, becomes to the first order invariant with displacement. Since the detector samples a fixed area within the image, its output is thereby also made invariant with spacing.

To express this another way, with a collection lens for the photosensitive detector having a one to one magnification, a fixed exposed area of the photosensitive detector will effectively get almost the same number of microwatts of energy per square millimeter from an illuminated target area even if the target area varies in distance therefrom by as much as plus or minus three millimeters, or more. Or, in this example, allowing a color printer test sheet displacement or freedom of movement in the printer paper path of at least plus or minus three millimeters relative to the spectrophotometer without affecting the ability of the system to read the test colors accurately.

To provide a further explanation mathematically, assume:

An image and object conjugates of 2f, that the system magnification is 1:1;

For small variations in media displacement, "d", image area $\sim(2f+d)^{-2}$;

Target irradiance is maintained constant by the collimating action of the condenser lens;

Total energy in the image $\sim(2F+d)^{-2}$;

Image energy density (image energy÷image area) is thus made independent of "d" for a magnification of 1:1; and A 1:1 magnification is thus the best operating point for the detector optics.

While 1:1 is preferred, it is projected that a range of 0.9:1 to 1.1:1, or approximately 1:1, may be usable in some situations with degraded accuracy. By "approximately" 1:1 magnification of the lens 13 (the lens for the fixed area of the light receptive portion of the photosensor D12), it is meant here that first order accuracy in the light intensity on the photosensor, and thus first order accuracy in its output signal, can also be obtained for a limited range above or below 1:1. That range would still allow a variation in target spacing from the spectrophotometer 12 of + or − approximately 2.5–3 mm within said first order color reflectance measurement accuracy, thus allowing approximately 6 mm or more of normal spacing between the defining or confining opposing baffles of the paper path at that point.

Thus, this lens system for transmitting the illumination from the test patch to the photodetector sensor provides effective displacement insensitivity in the electrical signals provided by that photodetector sensor for variations in displacement between the test patch and the spectrophotometer of at least 6 millimeters. That allows a corresponding amount of lateral displacement freedom of movement tolerance (and opposing baffles spacing), and/or sheet curl or cockle tolerance, to be provided for all of the printed sheets, including the test sheets, in the output path of said color printer. That is, the test sheets do not have to be pressed against, or closely confined against, a reference surface or the spectrophotometer, and the printer output path does not have to be modified in that respect.

An exemplary suitable focal length of the photosensor lens systems 18 and 19 can be about 11 mm. That appears to be a good tradeoff point between the amount of light energy desirably collected at the sensor and the achievement of displacement insensitivity in a reasonably sized spectrophotometer package. Different focal length lenses can be used, but the overall conjugate (the distance between the test patch and its image) would change correspondingly to maintain the same displacement insensitive behavior.

The concept is implementable with various technologies or conventional components, including hybrid chip on-board, which is preferred, especially to provide a single on-board chip or board for a plural LED spectrophotometer as shown. In that architecture, an appropriate selection of LED die with different wavelengths covering the visible spectrum may be mounted to a PWB. As will be further described with reference to the circuit example of FIG. 3, each LED may be lit in sequence.

The flux from each LED is collimated and centrally directed to be applied to the same test patch area under the center of the spectrophotometer in both 12 and 12'. That position is on the optical axis of the lens 13 or 13', which lens 13 or 13' is located in the center of the ring or circle of LEDs, as shown in FIG. 1. By recording the successive detector D12 outputs when a test patch is successively illuminated by each individual LED, the reflectance of the test patch as a function of different wavelengths can be determined. With a sufficient number of plural different LED output wavelengths that reflectance of the same test patch as a function of different wavelengths can be extrapolated or interpolated over the entire visible spectra.

Irrespective of the printer architecture, measurements need to be made in real time as the media passes across and through the spectrophotometer 12 sensing area, to avoid interference with normal media production and output. An exemplary test patch size for the spectrophotometer 12 may be around 15 to 30 mm, and the measurement thereof may take only about 2 to 5 milliseconds or less.

Now, with specific reference to the subject azimuthal sensitivity features, in the prior spectrophotometer embodiment configurations shown in the above cross-referenced applications the photosensor (detector) is on the central or zero axis of the spectrophotometer to receive reflected light perpendicularly (at 90 degrees) from the illuminated area of the test target, and that illumination is by plural LEDs spaced around that central axis aimed at 45 degrees to the test target.

In contrast, in the present spectrophotometer 12 configuration of FIGS. 1 and 2, or 14, the plural different color emission LEDs are together in one central unit, board, or chip, projecting light in parallel along the central or optical axis of the spectrophotometer at 90 degrees to the test target (e.g., the color patch on the moving sheet of paper), so as to provide a substantially circular, rather than elliptical, illuminated area of the test target. One or more photo-sensors are optically oriented at 45 degrees to the test target to receive the reflected light from the test target. This change from a 45–0 degree system to a 0–45 degree system has been discovered to substantially reduce measurement errors from test target misalignment relative to the spectrophotometer.

By way of further explanation of the above, in a typical printer paper path with spaced baffles the angle of the test paper sheet surface relative to the central axis of the spectrophotometer can vary somewhat, for various reasons. By having all the LEDs centrally located, their illumination pattern on the test target may be formed from rays that hit the target at approximately 90 degrees, i.e., normal to the target. This will produce a circular or nearly circular irradiance pattern on a selected area of the target when the target surface is at 90 degrees thereto, as intended. When the target surface deviates from 90 degrees, by factors such as paper lead or trail edge curl, paper buckle, sensor mounting misalignment, or other effects, this LED irradiance pattern becomes only slightly elliptical, with an area larger than the circle by the factor $1/\cos(\theta)$, where theta is the deviation from 90 degrees. For example, if the incident angle were to become 93 degrees, then theta would be 3 degrees, the area of the irradiance would be $A/\cos(3)=1.001A$, where A was the selected illuminated area. The flux reflected from the target and collected by the detectors is proportional to the irradiance. Since it may be seen that the irradiance (energy per unit area) varies very little for this 3 degrees example, only by 0.001, the signals from the detectors likewise vary very little.

It may be seen in FIG. 2 that the flux from each of the LEDs is collimated by the same condensing lens 13 and applied to the test patch surface at a normal incident angle of 90 degrees or perpendicular thereto to form the illuminated area. An inverted image of that illuminated area is formed in the focal plane of each projection lens 18 and 19 (which are providing the desired 1:1 imaging optics) where that inverted image overfills its respective optical detector D12 (D12A and D12B).

Other advantages of the above-described configuration of centralized LEDs include: being able to use a single condenser lens for all of the LEDs, instead of a separate lens for each; easier measurement of all the LED temperatures accurately with only one integrated circuit; and a less expensive to implement architecture.

An additional disclosed feature in improving spectrophotometer accuracy for variable target angles is to provide, in addition to the above, the averaging of the outputs of plural photodetectors which are viewing the irradiance area from different positions around it, such as in FIG. 1, so as to average the varying azimuthal reflectivity of the target area, and thus further increase the insensitivity to angular misalignment with the target area. In the above example of a 3 degree tilted target surface, a detector on one side of the spectrophotometer central axis will view the illuminated target area at 45 minus 3 degrees, while a detector on the opposite side of the spectrophotometer will view the same illuminated area at 45 plus 3 degrees (or vice versa) but their output signals may be averaged to cancel out that effect, as by summing their outputs, as shown in FIG. 3.

Although four photosensor D12 sites are shown in FIGS. 1 and 2 spaced at 90 degrees around the LEDs central axis (or, six at 60 degrees apart could be employed) it is believed that a spectrophotometer configuration of only three photosensor sites spaced around the central axis by 120 degrees from one another (and thus needing only 4 lenses in total) is sufficient to reduce measurement errors from that azimuthal source to less than one percent.

As shown in FIGS. 6 and 14, the plural spaced detectors may be low cost single chip, multi-pixel, plural color, photo-detectors, such as those described in detail below and in the cross-referenced copending commonly owned U.S. application Ser. No. 09/862,247filed May 22, 2001, by Jagdish C. Tandon and Lingappa K. Mestha, Attorney Docket No. D/99660, with a reduced numbers of LEDs. However, that is not essential. Even with only three conventional individual single cell photosensors, the disclosed spectrophotometer configuration can reduce the number of LEDs from, e.g., 10, 12 or even 24 LEDS down to only eight LEDs. However, as will be described, by optionally using said plural color multiple photo-site detectors, as few as only three or four different LEDs may be employed and provide increased measurement speed and/or spectral coverage.

This optional additional feature disclosed herein is the particular subject of the above cross-referenced copending and commonly owned U.S. Appln. No. 09/862,247, filed May 22, 2001, by Jagdish C. Tandon and Lingappa K. Mestha, Attorney Docket No. D/99660. It allows the spectrophotometer 12' embodiment to have a reduced total number of LEDs (e.g., only three or four) of appropriate different color spectral outputs to sequentially illuminate the exemplary color test targets 31 or 31' on exemplary test sheets 30 or 31' as in FIG. 4 or 5. Furthermore, in this spectrophotometer 12 the reflected illumination level is desirably not detected by a single photocell sensor or individual photocells. Instead, it may be detected by multiple spectral response photo-sites of a low cost color image sensor array chip 14, as in the example of FIG. 6, having rows of closely adjacent plural color sensors (photo-sites D12F, D12E, D12C and D12D) with respective plural different integral color filtering (none, blue, green and red) providing plural different spectral sensitivities, and plural parallel output signals, rather than a single output signal from an individual photosensor. The respective different color output LEDs D1, D2, D3 and D4 may be switched on in a predetermined sequence (as in FIG. 3 or otherwise) to provide plural specific different spectral measurements within the visible wavelengths, as illustrated in FIGS. 8–13. Also, it is preferable that one LED provide white illumination. This provides a fast and low cost general color sensing solution.

If desired, those spectral measurements of an area of a test target may be converted to provide a true broad reflectance spectra, through known or other reconstruction and extrapolation algorithms. Both the number and spectra of the LED illuminators and the photosensor sites may be varied, where appropriate, and are not necessarily limited to the specific numbers and specific wavelengths of this specific embodiment example.

It will be noted especially with respect to these descriptions that the terms "photosensor sites," "photo-sites," "photosensitive cells," "cells," "detectors" (D) or "sensors" are variously used interchangeably in descriptions herein, as in the art, unless otherwise indicated.

Commercial mass-produced low cost document imaging bars are typically formed by edge butting together a plurality of individual imaging chips, each having multiple tiny and closely spaced photo-sites, as schematically shown in the FIG. 6 enlarged view example of such chip 14. Typically, each such chip 14 has three rows of such photo-sites (D12D, D12C and D12E here) manufactured with integral filters for red, green and blue, respectively. Also, each chip 14 typically has integrated electronics; sample and hold circuitry, etc. The spectrophotometer 12 desirably utilizes at least one (or more, depending on the spectrophotometer design) of these low cost individual imaging chips 14. It is suggested here that chips 14 may be obtained from a manufacturer before they are fastened together into a document imaging bar.

As one example of such a known document imaging bar, it may be made from twenty of such individual imaging chips 14, with each chip 14 being 16 mm long. Each such chip can read 400×660 pixels, provided by 248 photosensitive cells, with a 63.5 micro-meter pitch between cells. The cells are in three parallel rows, with filters for red, green and blue in the respective rows, as shown in the example of FIG. 5. These chips are made with integral electrical leads and connecting electronics already provided to all of these 248 photo-sites.

If desired, and as also illustrated in the FIG. 6 example, another such row of photo-sites, D12F, may be added to these chips, for white light (broad spectrum) sensing, by a relatively simple manufacturing modification. That is, by simply adding one more such parallel row of cells in the same silicon semiconductor manufacturing steps (or otherwise) to provide another row of otherwise identical or similar photo-sites, but having no color filtering layer formed over the cells. Alternatively, a different filter may be superimposed on the photo-sites of that added fourth row. Alternatively, the chip may be made with the same existing three rows of cells, but with every fourth cell in each row made without any filter. Or, every fourth cell in each row may be made a different filter. Some aperturing (exposed area reduction, such as by partial masking) may also be provided if desired for the unfiltered cells.

The cost of a suitable such image sensor chip, as is, or modified as described, may be considerably lower than a non-commercial photosensor. It can also provide a much higher level of circuit integration. Thus, a much more cost-effective spectrophotometer can be made therefrom than from individual photosensors, and a number of parallel sensing outputs can be provided.

As indicated above, the exemplary color image sensor chip 14 may differ somewhat from a conventional document color image sensor array or bar in that some of the photo-sites (D12F) on the color image sensor array may be left un-covered, without any color filter layers. By doing so, a fourth, broadband, spectral measurement is enabled from those unfiltered photo-sites along with the three different spectral measurements that the chip normally provides from its three differently colored filter covered photo-sites D12E, D12C and D12D. As noted, while commercially available color image sensor array chips typically have three rows of photo-sites that are coated with 3 different color filter layers; red, green and blue, thus providing a three-color spectra measurement capability, these same sensor array chips can be modified at low cost by simple modifications to provide an additional fourth spectral measurement capability. That is, modified so that some of the photo-sites are not color filtered. A broad spectrum illumination source, such as a white light LED, may be used therewith in a spectrophotometer configuration, as further described herein.

As shown herein, a spectrophotometer 12 with a suitable combination of a relatively small number of plural LEDs plus plural simultaneously exposed photo-sites, with an appropriate LED switching sequence to turn the LEDs on and off, can rapidly provide a large number of test target color measurements. As the number of measurements is so increased, the color measurement capability also becomes more accurate.

Depending on the particular color correction or calibration system needs, different numbers of LEDs can be used. However, it has been found that only a few LEDs having spectral output covering the sensitivity ranges of only two or more different types of photo-sites, plus a white LED or other light source, can provide a low total components count, and thus a lower cost, spectrophotometer, yet provide a relatively large number of spectra measurements.

This can be further understood by reference to the exemplary spectral curves shown in FIGS. 8–13 and their above Fig. descriptions. In FIGS. 8–13 the respective curves corresponding to exemplary LEDs have been labeled with the same reference numbers of the exemplary LEDs, D1, D2, D4 or D5.

As noted, FIG. 6 is a schematic and greatly enlarged portion of a exemplary color image sensor array chip 14 which may be utilized in the exemplary spectrophotometer. Show in FIG. 6 is an exemplary illuminated area 34 thereof. This area 34 is illuminated by LED illumination through lens 13, which is reflected from the test target area through the lens systems 18 and 19 to simultaneously illuminate multiple photo-sites in the three or four rows of each sensor chip 14. Those simultaneously illuminated photo-sites include the red, green, blue photo-sites D12D, D12C and D12E, and also the unfiltered photo-sites D12F if they are provided on the chip 14.

The Table below further shows the number of spectral measurements that can be made with examples of combinations of different numbers of specific LEDs and an image sensor chip 14 with different photo-site filters:

| LEDs | | Number of Spectral Measurements | |
|---|---|---|---|
| | | With 3 Color (R,G,B filters) | With 4 Color (R,G,B filters) + no filter) |
| Types | Number | Image Sensor | Image Sensor |
| White | 1 | 3 | 4 |
| White, +595 nm or 505 nm | 2 | 5–6 | 7–8 |
| White, 595 nm, 505nm | 3 | 7–9 | 10–12 |
| White, 595 nm, 505 nm, 430 nm | 4 | 8–12 | 12–16 |

It may be seen from the last example of this Table that with a 4-color image sensor chip 14 (with unfiltered photo-sites in addition to red, green and blue filter photo-sites), that 4, 3, 3 and 2 (12 total) sets of spectral measurements can be obtained by detecting a color test target 31 illumination by only four LEDs (white, 595 nm peak, 505 nm peak and 430 nm peak). Thus, one can see that 12 spectral combinations can be measured using a spectrophotometer having only four LEDs and a single, low cost, multipixel (multiple photo-sites) image sensor array (chip) 14.

Integration times used with various rows of the image sensor array chip 14 can be independently controlled to match the LED power levels to get suitable output signals from the sensor array.

As discussed, some of the photo-sites in one or more of these rows are desirably left uncovered (with no color filters) to get four spectral outputs from an otherwise conventional 3 row image sensor array. In general, the photo-sites that are not covered with color filters will provide a much larger output signal than those that are covered with filters. To compensate, part of the sensing area of these uncovered (unfiltered) photo-sites can be optionally coated in manufacturing with an opaque material or multiple layers of all three color filter layers to reduce their light sensitivity.

Any or all of the outputs of the sensor chip 14 may, of course, be calibrated/reconstructed to provide true reflectance values. For example, as in the above-cited U.S. application Ser. No. 09/562,072, filed May 1, 2000 by Lingappa K. Mestha, et al., entitled "System and Method for Reconstruction of Spectral Curves, Using Measurements from a Color Sensor and Statistical Techniques," Attorney Docket No. D/99803.

It may be seen that this allows a spectrophotometer which combines the spectral differentiation capabilities of a low cost plural spectra image sensor 14 with the spectral outputs of a relatively small number of different LEDs to enable a cost effective, high performance, spectrophotometer. The following and/or other advantages may be provided: multiple measurements can be made and outputted in parallel corresponding to three or four different color image sensor outputs in parallel; cost can be reduced by reducing the number of LEDs and having lower detector and detector electronics costs; and the integration time of the three or four rows of a three or four row image sensor array can be adjusted independently to match the power levels of different LEDs.

Referencing the first line of the above table, an alternative application, function, or option is to turn on, and leave on, only the white illumination source, for all of the color test patches being read at that time, to provide a "colorimeter" function of RGB values from the chip 14 outputs.

Describing now the exemplary operation of the exemplary color sensing system 10 using an exemplary spectrophotometer 12 or 12' (with or without chips 14), as noted, certain aspects thereof are also described in above-cited references and the above cross-referenced U.S. application Ser. No. 09/535,007, filed Mar. 23, 2000, by Fred F. Hubble, III and Joel A. Kubby, Attorney Docket No. D/99511i.

In the illustrated example here, the spectrophotometer 12 may be utilized with circuitry, such as that of FIG. 3, or otherwise, to accurately read reflected light from one or more different color test patches such as 31 printed on moving color test sheets 30 such as that shown in FIG. 4. The test sheets 30 may be conventionally printed on various print media such as conventional print papers or plastics, preferably the same print media as the planned or concurrent print job itself. The color test patches 31 may be printed in the same manner and by the same print apparatus as the regular print jobs by any of various different conventional color printer or printing systems, of which the xerographic printer 20 of FIG. 7 is merely one example.

As described, the disclosed spectrophotometer 12 can accurately read the colors of the test patches 31 even though the test sheets 30 are variably spaced from the spectrophotometer 12 during their color measurements, and are moving. Thus, the color measurements are not affected by normal variations in sheet surface positions in a normal paper path of a printer. This allows the simple mounting of the spectrophotometer 12 at one side of the normal printed sheets output path 40 of the printer 20 (or various other color reproduction systems).

Briefly describing the exemplary color printer 20 of FIG. 7 in more detail, it is schematically illustrating an otherwise conventional xerographic laser color printer, details of various of which will be well known to those skilled in that art and need not be re-described in detail herein. Examples of further descriptions are in the above-cited Xerox Corp. U.S. Pat. No. 5,748,221, etc., and other art cited therein. A photoreceptor belt 26 is driven by a motor M and laser latent imaged or exposed by a ROS polygon scanning system 24 after charging (or an LED bar). The respective images are developed by a black toner image developer station 41 and/or one or more of three different color toner image developer stations 42A, 42B, 42C. The toner images are transferred at a transfer station 32 to sheets of copy paper fed from an input tray stack 36. Where one or more test sheets 30 are being printed instead of normal document images (at times, and with color tests, selected by the controller 100), each such test sheet 30 may be fed from the same or another sheet supply stack 36 and its test images transferred in the normal manner. The test sheet 30 is then outputted through the fuser 34 to the same normal output path 40, as if it were any other normal sheet being normally color printed. The test sheets 30 may be dual mode sheets also serving as banner sheets for print job separations, with typical printed banner sheet information, such as one or more of the user's name, the document title, the date and time, or the like.

The spectrophotometer 12 here is mounted at one side of that output path 40 (or, it could even be mounted over the output tray 44) to sense the actual, fused, final colors being printed. The spectrophotometer output signals provide the input for the on-line color sensing and correction system 10, here with a microprocessor controller 100 and/or interactive circuitry and/or software. The controller 100, and sheet sensors along the machine 20 paper path, conventionally controls the feeding and tracking of sheet positions within the printer paper path. The controller 100 and/or a conventional sensor for fiduciary marks 33 or the like on the test sheet 30 can provide control or actuation signals to the spectrophotometer 12 circuitry for the spectrophotometer 12 to sequentially test or read the colors of each of the test patches 31 on the test sheet 30 as that test sheet 30 moves past the spectrophotometer 12 in the output path 40. The test patches 31 can be variously located and configured, as blocks, strips, or otherwise, of various digitally selected solid color images.

Thus, in the disclosed embodiment, plural test sheets 30 of paper or other image substrate material being printed by the color printer 20 can be automatically printed with pre-programmed plural test patches 31 of defined colors, preferably with associated simple fiduciary marks for signaling the reading location of each colored test patch on the test sheet. Each test sheet 30 moves normally past the fixed position spectrophotometer 12, which is unobstructedly mounted at one side of the normal post-fuser machine output path 40 to both illuminate and view sheets passing thereby. This is in contrast to those prior systems requiring removing and holding a test sheet still, and moving a standard contact colorimeter or spectrophotometer over the test sheet.

The normal target area in the system 10 embodiment herein is an area of a printed color test patch or patches 31 on the sheet of paper being otherwise normally printed and outputted. An alternate or calibration target area could be an unprinted area of the test paper sheet, or a white, grey, black or other color standardized test tile or surface automatically solenoid (or manually) inserted into the effective field of view of the spectrophotometer.

The test target illumination by any one of the LEDs provides a variable level of light reflected from that target depending on the colors of the test patch and the selected illumination source. FIG. 2 illustrates, with dashed line light rays, both the LED target area illumination and the focusing of a portion of the reflected illumination therefrom by the projection lenses 18 and 19 (a simple two-element optic in this example).

Although conventional glass or plastic lenses are illustrated in the spectrophotometer 12 of FIGS. 1 and 2, it will be appreciated that fiber optics or selfoc lenses could be utilized instead in other applications. For example, fiber optics may be used to conduct the illumination from the LEDs. Also, a collecting fiber optic may be used if desired, for example, to space the detecting photosensor remotely from the focal plane of the lenses.

As utilized in this disclosed embodiment of an on-line color sensing system 10, this low cost spectrophotometer 12, as mounted in the printer 20 copy sheet output path 40, can thus be part of a color correction system to automatically control and drive to color printing accuracy the printer 20 CMYK color generation with a small number of printed test sheets 30. The color correction system can sequentially look at a relatively small series of color test patterns printed on copy sheets as they are outputted. One or more mathematical techniques for color error correction with multiple spectrophotometer-detected output color signals for each color patch as input signals can provide for a greatly reduced number of required printed test patches, as shown in the above-cited references. That is, by recording the detector array multiple outputs when a test patch is successively illuminated by each individual LED, the reflectance of the test patch as a function of different wavelengths can be determined, and that reflectance of the test patch, as a function of different wavelengths, can be extrapolated or interpolated over the entire visible spectra.

An accurate color control system, as disclosed herein, can thus regularly or almost constantly provide for testing and storing current machine color printing responses to color printing input signals (an up-to-date model) for remapping LAB (or XYZ) "device independent" color inputs (for later conversion to device dependent RGB or CMYK color space for printing). That information can also be profiled into a system or network server for each different machine (and/or displayed on a CRT controller for color manipulation).

To provide a desired "overfill" of the photosensors of FIG. 6, to avoid any effect of an enlarged exposure area on the imaging chip 14 from an increased target spacing from the spectrophotometer, the connecting circuitry may be set to ignore or threshold any only partially exposed cells (photosites) and/or may be set to only look at a fixed minimum number of centrally exposed cells, ignoring any signals from outer cells even if those outer cells are being illuminated by light reflected from the target.

With the differently color filtered cells of the FIG. 6 chip 14, the connecting circuitry can also tell which cells are being exposed to which color from an illuminated test patch. Thus, as shown in FIG. 5, plural color test patches can be simultaneously illuminated, yet can be desirably utilized for increased data. That is, more than one individual color test patch can be tested at a time by this spectrophotometer 12. However, that is not required here. Exposing (sensing) only one single color test patch at a time as shown in the above cross-referenced applications, several cited references, and in FIG. 4 here, may be utilized with conventional single-cell photosensors, such as D12A and D12B. The multiple signals provided from multiple photo-sites with plural different color filters may be utilized for analyzing the reflected light from either type of test target.

FIG. 3 is a schematic or block diagram of an exemplary LED driver and signal processing circuits of the spectrophotometer 12 of FIGS. 1 and 2, portions of which are generally identified here for convenience as part of the controller 100, even though it could be, in whole or in part, a separate circuit, desirably having a single driver chip or die for all of the LEDs in the spectrophotometer itself. In response to regular timing signals from the circuit 110 labeled "LED Drive, Signal Capture, & Data Valid Logic" here, each LED is pulsed in turn by briefly turning on its respective transistor driver Q1 through Q4, by which the respective different spectra LEDs D1 through D4 are turned on by current from the indicated common voltage supply through respective resistors R1 through R4. Four different exemplary light output colors of the four respective LEDs are indicated in FIG. 3 by the legends next to each of those LEDs. Thus, each LED may be sequenced one at a time to sequentially transmit light though the condenser lens 13 shown in FIG. 2 and FIG. 14.

While the LEDs in this example are turned on one at time in sequence, it will be appreciated that the system is not limited thereto. There may be measurement modes in which it is desirable to turn on more than one LED or other illumination source at once on the same target area.

As also illustrated in the circuit example of FIG. 3, at the right hand side the relative reflectance of each actuated LEDs color or wavelength may measured by conventional circuitry or software for amplifying (112) and integrating (114) the respective outputs of the photodiode detector array of photo-sites, as generalized by D12 in FIG. 3, and directing this integrated signal information to a sample and hold stage 116. That stage 116 can provide an output signal indicated here as $V_{out}$ when released by an enabling signal input shown from circuit 110, which also provides an accompanying "Data Valid" signal.

As discussed, the corresponding LED pulsing and detector sampling rate is sufficiently non-critical and rapid for sampling each of multiple reasonable size color test patches on a normal size copy sheet moving by the spectrophotometer even for a high speed printer moving sheets rapidly through its paper path. However, by briefly pulsing the common LED driver voltage source to provide brief LED drive currents at a level above what is sustainable in a continuous current mode, higher flux detection signals can obtained and the test patch can thus be interrogated in a shorter time period. In any case, by integrating the signal, such as with integrator 114 here, enhanced signal to noise ratios can be achieved. It may be seen by those skilled in the art that FIG. 3 shows merely one example of a relatively simple and straightforward circuit. It, or various alternatives, can be readily implemented in an on-board hybrid chip or other architecture. Since the chip 14 of FIG. 6 has built-in electronics, the right-hand side circuitry of FIG. 3 may not be needed for its output.

An additional conventional LED light emitter and detector may be integrated or separately mounted to detect black fiduciary or timing marks 33 printed on the test sheet 30 of FIG. 4, thereby providing an enable signal for illumination and reading within the respective color test patch areas. Those fiduciary marks 33 indicate the presence of an adjacent test patch 31 in the field of view of the spectrophotometer 12. However, it will be appreciated that with sufficiently accurate sheet timing and positional information already conventionally provided in the printer 20 controller 100, or provided by spectrophotometer output data, such fiducial marks 33 may not be needed. These fiducial marks 33 may be along side of their corresponding color test patch or patches area as shown in FIG. 4, or in between each (spaced apart) color test area. I.e., the fiducial marks may be parallel to, or in line with, the test patches in the direction of motion of the test sheet relative to the spectrophotometer.

Individual calibration for each of the spectrophotometer's LED spectral energy outputs may be done by using a standard white (or other) tile test target of known reflectivity for the spectrophotometer to convert each LED measurement to absolute reflectance values. This calibration can be done frequently, automatically, and without removing the spectrophotometer from the printer with a standard white calibration tile test surface, such as 47 shown in FIG. 7, being manually, or preferably automatically (as by a solinoid), placed oppositely from the spectrophotometer 12, on the other side of the paper path 40 but in the field of view of the photosensor array and its lens system 13. Thus, during any selected, or all, of the inter-sheet gaps (the normal spacing between printed sheets in the sheet path of the printer) a recalibration can be carried out without having to move or refocus the spectrophotometer.

This or other calibration systems can convert the individual output energies of the respective LEDs at that point in time on the calibration tile 47 into respective individual reflectance measurement values from the photosensor array D12. That calibration data can then be electronically compared to previously stored standard characteristics data in the controller 100, or elsewhere, to provide calibration data for the spectrophotometer 12, which may be used for calibration of its other, color test patch generated, data. The calibration data can also be used to adjust the individual LED output energies to compensate for LED aging or other output changes, by adjusting the applied current or voltage (if that is individually programmable) or by increasing the respective turn-on times of the LEDs, where the photodetector D12 output signal is being integrated, as in this embodiment.

Initial spectrophotometer calibration data may be stored in an integral PROM IC shipped with the spectrophotometer, if desired. Alternatively, LED output initial calibration data may be programmed into the software being used to analyze the output of the spectrophotometer in other known manners, such as loading it into the disc storage or other programmable memory of the printer controller 100 or system print server.

It is well known to use conventional optical filters of different colors for each of respectively different color LED spectrophotometer target illumination sources. In particular, it is well known to use such color filters to exclude secondary emissions from LEDs, and/or to further narrow the output spectra of LED illumination sources. Such color filters are believed to be used for that purpose in some Accuracy Microsensors™ LED based commercial products, for example. However, it will be further appreciated by those skilled in this art that such color filters are not needed for those LEDs having sufficiently narrow bandwidths or for those LEDs which do not have secondary emissions that need to be suppressed. Therefore, filters may, but need not, be employed for the LEDs of the subject spectrophotometer.

It will also be noted that spectrophotometers have been made using illumination sources other than LEDs. For example, multiple electroluminescent (EL) emitters with filter and active layers as in HP U.S. Pat. No. 5,671,059 issued Sep. 23, 1997, or incandescent lamps. Also, as noted in the introduction, white (instead of narrow spectrum) LED illuminators and plural sensors with different color filters are disclosed in EP 0 921 381 A2 published Sep. 06, 1999 for a color sensor for inspecting color print on newspaper or other printed products.

While the embodiments disclosed herein are preferred, it will be appreciated from this teaching that various alternatives, modifications, variations or improvements therein may be made by those skilled in the art, which are intended to be encompassed by the following claims.

What is claimed is:

1. A low cost broad spectrum spectrophotometer for measuring the colors of test target areas which may be variably displaced and variably angularly oriented relative to said spectrophotometer, comprising plural illumination sources and a common lens system for sequentially projecting plural different spectral illuminations from said plural illumination sources substantially perpendicular to the color test target area to illuminate a substantially circular illumination area of the color test target area, a sequential actuation circuit for sequential actuation of said plural illumination sources, and at least one photodetector spaced from said common lens system and spaced from said substantially circular illumination area of the color test target area to angularly receive reflected light from said substantially circular illumination area, so as to provide reduced angular displacement sensitivity of said spectrophotometer relative to said color test target area.

2. The low cost broad spectrum spectrophotometer of claim 1, wherein said at least one photodetector comprises a detector array of plural photodetectors spaced apart on at least two opposing sides of said common lens system and spaced from said substantially circular illumination area of the color test target area to differently angularly receive reflected light from said substantially circular illumination area at substantially the same angle from opposing directions, so as to provide additionally reduced angular displacement sensitivity of said spectrophotometer relative to said color test target area.

3. The low cost broad spectrum spectrophotometer of claim 2, wherein there are three said plural photodetectors.

4. The low cost broad spectrum spectrophotometer of claim 2, wherein said plural photodetectors are mounted in a substantially circular pattern surrounding said common lens system to define a central axis.

5. The low cost broad spectrum spectrophotometer of claim 2, wherein said plural photodetectors each have a projection lens system having approximately 1:1 imaging optics.

6. The low cost broad spectrum spectrophotometer of claim 1, wherein said plural illumination sources comprise approximately eight or less LEDs providing a correspondingly limited number of different spectral illuminations.

7. The low cost broad spectrum spectrophotometer of claim 1, wherein said limited plurality of illumination sources comprises less than approximately five LEDs providing a corresponding limited number of different spectral illuminations, and said at least one photodetector comprises a photodetector with plural photo-sites and plural different spectral responses.

8. The low cost broad spectrum spectrophotometer of claim 1 wherein said at least one photodetector is a plural color spectrum photodetector.

9. A method of broad spectrum color measurement of a color test area comprising substantially perpendicularly sequentially illuminating a substantially circular area of said color test area with a limited plural number of different spectra illuminations through a common lens system and sequentially non-contact measuring a portion of the reflected illumination from said sequentially illuminated substantially circular area of said color test area at approximately 45 degrees thereto with at least one photodetector spaced from said color test area to provide reduced angular sensitivity of said photodetector relative to said color test area.

10. The method of broad spectrum color measurement of a color test area of claim 9, utilizing a detector array comprising plural photodetectors mounted on opposing sides of said color test area, the outputs of which are averaged to further reduce said angular sensitivity relative to said color test area.

11. The method of broad spectrum color measurement of a color test area of claim 10, wherein said plural photodetectors each receive said reflected illumination through a projection lens system having an approximately 1:1 imaging ratio to provide relative displacement insensitivity of said photodetectors relative to said color test area.

12. The method of broad spectrum color measurement of claim 9 wherein said at least one photodetector has plural color spectrum photodetection.

13. A low cost broad spectrum spectrophotometer comprising means for sequentially perpendicularly illuminating a common substantially circularly illuminated color test area with a limited plural number of different spectra illuminations, and means for sequentially measuring the angularly reflected illumination from said sequentially illuminated substantially circularly illuminated color test area by applying said reflected illumination simultaneously to plural photodetectors spaced around said common color test area and summing the outputs of said photodetectors to provide an averaged output.

14. The low cost broad spectrum spectrophotometer of claim 13, wherein said limited plural number of different spectra illuminations is provided by a plurality of different LEDs in a common area with a common shared lens system and a sequential actuation circuit for said LEDs.

15. A system for more accurately measuring the color of a material, comprising:

an illumination system for illumination of a sample area of said material approximately perpendicularly thereto, and a color measurement system with a plurality of separate photodetectors for measuring the color reflected from said illumination system illumination of said sample area of said material at a substantial angle to said illuminated sample area of said material, said plurality of separate photodetectors being spaced arrayed around said illuminated sample area of said material to receive said reflected illumination from said illuminated sample area of said material from substantially opposing directions and from said substantial angle to said illuminated sample area of said material, wherein said illumination system illumination of said sample area of said material provides a plurality of rapid sequential illuminations of different spectral illuminations.

16. A system for more accurately measuring the color of a material, comprising:

an illumination system for illumination of a sample area of said material approximately perpendicularly thereto, and a color measurement system with a plurality of separate photodetectors for measuring the color reflected from said illumination system illumination of said sample area of said material at a substantial angle to said illuminated sample area of said material, said plurality of separate photodetectors being spaced arrayed around said illuminated sample area of said material to receive said reflected illumination from said illuminated sample area of said material from substantially opposing directions and from said substantial angle to said illuminated sample area of said material, wherein said substantial angle is approximately 45 degrees, and wherein said illumination system illumination of said sample area of said material provides a plurality of rapid sequential illuminations of different spectral illumination.

17. The system of claim 16, wherein there are three said plural photodetectors.

18. A system for more accurately measuring the color of a material, comprising:

an illumination system for illumination of a sample area of said material approximately perpendicularly thereto, and a color measurement system with a plurality of separate photodetectors for measuring the color reflected from said illumination system illumination of said sample area of said material at a substantial angle to said illuminated sample area of said material, said plurality of separate photodetectors being spaced arrayed around said illuminated sample area of said material to receive said reflected illumination from said illuminated sample area of said material from substantially opposing directions and from said substantial angle to said illuminated sample area of said material, wherein illumination system illumination of said sample area of said material provides a plurality of rapid sequential illuminations of different spectral illuminations and wherein said plurality of separate photodetectors spaced arrayed around said illuminated sample area of said material are relatively evenly circularly positioned around said illuminated sample area.

19. A system for more accurately measuring the color of a material, comprising:

an illumination system for illumination of a sample area of said material approximately perpendicularly thereto with a plurality of rapid sequential illuminations of different spectral illuminations, and a color measurement system with a small number of separate photodetectors for measuring the color reflected from said illumination system illumination of said sample area of said material at a substantial angle to said illuminated sample area of said material, said small number of separate photodetectors comprising plural color spectrum photodetectors, said plurality of separate photodetectors being spaced arrayed around said illuminated sample area of said material to receive said reflected illumination from said illuminated sample area of said material from substantially opposing directions and from said substantial angle to said illuminated sample area of said material.

\* \* \* \* \*